(12) United States Patent
Muruganathan et al.

(10) Patent No.: US 12,185,310 B2
(45) Date of Patent: Dec. 31, 2024

(54) SYSTEMS AND METHODS FOR SIGNALING PDSCH DIVERSITY BY DETERMINING ASSOCIATIONS BETWEEN DMRS PORTS AND RV's

(71) Applicant: Telefonaktiebolaget LM Ericsson (publ), Stockholm (SE)

(72) Inventors: Siva Muruganathan, Stittsville (CA); Sebastian Faxér, Stockholm (SE); Mattias Frenne, Uppsala (SE); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 511 days.

(21) Appl. No.: 17/290,840

(22) PCT Filed: Nov. 1, 2019

(86) PCT No.: PCT/IB2019/059412
§ 371 (c)(1),
(2) Date: May 3, 2021

(87) PCT Pub. No.: WO2020/089865
PCT Pub. Date: May 7, 2020

(65) Prior Publication Data
US 2022/0124761 A1 Apr. 21, 2022

Related U.S. Application Data

(60) Provisional application No. 62/755,115, filed on Nov. 2, 2018.

(51) Int. Cl.
*H04L 5/00* (2006.01)
*H04W 72/1273* (2023.01)
(Continued)

(52) U.S. Cl.
CPC ....... *H04W 72/1273* (2013.01); *H04L 5/0051* (2013.01); *H04W 72/23* (2023.01); *H04W 80/02* (2013.01)

(58) Field of Classification Search
CPC . H04W 72/1273; H04W 72/23; H04W 80/02; H04L 5/0051; H04L 5/0044; H04L 5/006; H04L 5/0094; H04L 5/0035
See application file for complete search history.

(56) References Cited

U.S. PATENT DOCUMENTS

2015/0049695 A1  2/2015  Aiba et al.
2020/0107352 A1*  4/2020  Tsai .................... H04B 7/0617
(Continued)

FOREIGN PATENT DOCUMENTS

CN  104618000 A  5/2015
CN  104704754 A  6/2015
(Continued)

OTHER PUBLICATIONS

Ericsson, "R1-1900728: On multi-TRP and multi-panel," 3GPP TSG RAN WG1 Meeting Ad-Hoc Meeting 1901, Jan. 21-25, 2019, Taipei, Taiwan, 9 pages.
(Continued)

*Primary Examiner* — Un C Cho
*Assistant Examiner* — Lalita W Pace
(74) *Attorney, Agent, or Firm* — Withrow & Terranova, PLLC

(57) ABSTRACT

Systems and methods for signaling for Physical Downlink Shared Channel (PDSCH) diversity are provided. In some embodiments, a method performed by a wireless device for receiving a plurality of downlink transmissions includes determining an association between one or more Demodulation Reference Signal (DMRS) ports and one or more associated Redundancy Values (RVs). The method also
(Continued)

includes receiving the plurality of downlink transmissions using the association. In some embodiments, this enables a single Downlink Control Information (DCI) to be used to schedule different redundancy versions of the same transport block from the different Transmission/Reception Points (TRPs) which helps improve reliability of decoding a transmission successfully within stringent latency requirements.

22 Claims, 16 Drawing Sheets

(51) Int. Cl.
*H04W 72/23* (2023.01)
*H04W 80/02* (2009.01)

(56) References Cited

U.S. PATENT DOCUMENTS

| | | | | |
|---|---|---|---|---|
| 2020/0221487 | A1* | 7/2020 | Lee | H04L 5/0044 |
| 2020/0296704 | A1* | 9/2020 | Vilaipornsawai | H04L 5/0094 |
| 2021/0185709 | A1* | 6/2021 | Takeda | H04W 72/1273 |
| 2021/0219327 | A1* | 7/2021 | Jiang | H04W 72/23 |
| 2021/0359808 | A1* | 11/2021 | Takeda | H04L 5/0023 |

FOREIGN PATENT DOCUMENTS

| | | | |
|---|---|---|---|
| CN | 106797656 A | 5/2017 | |
| CN | 108352882 A | 7/2018 | |
| CN | 110022615 A | 7/2019 | |
| WO | WO-2019134512 A1 * | 7/2019 | ........ H04W 72/1273 |
| WO | 2020024297 A1 | 2/2020 | |
| WO | 2020075233 A1 | 4/2020 | |

OTHER PUBLICATIONS

Ericsson, "R1-1902861: On MAC-CE signaling impact of Rel-16 TCI indication framework," 3GPP TSG RAN WG1 Meeting #96, Feb. 25-Mar. 1, 2019, Athens, Greece, 3 pages.
Notice of Reasons for Refusal for Japanese Patent Application No. 2021-523771, dated Jul. 8, 2022, 7 pages.
1 Examination Report for Indian Patent Application No. 202147024198, dated Feb. 23, 2022, 6 pages.
Author Unknown, "Technical Specification Group Radio Access Network; NR; Physical channels and modulation (Release 15)", Technical Specification 38.211, Version 15.3.0, Sep. 2018, 3GPP Organizational Partners, 96 pages.
Author Unknown, "Technical Specification Group Radio Access Network; NR; Multiplexing and channel coding (Release 15)", Technical Specification 38.212, Version 15.3.0, Sep. 2018, 3GPP Organizational Partners, 99 pages.
Author Unknown, "Technical Specification Group Radio Access Network; NR; Physical layer procedures for data (Release 15)", Technical Specification 38.214, Version 15.3.0, Sep. 2018, 3GPP Organizational Partners, 96 pages.
Author Unknown, "Technical Specification Group Radio Access Network; NR; Radio Resource Control (RRC) protocol specification (Release 15)," Technical Specification 38.331, Version 15.3.0, Sep. 2018, 3GPP Organizational Partners, 445 pages.
Huawei, et al., "R1-1810104: Enhancements on multi-TRP/panel transmission," 3GPP TSG RAN WG1 Meeting #94bis, Oct. 8-12, 2018, Chengdu, China, 17 pages.
Huawei, et al., "RP-181477: New SID on Physical Layer Enhancements for NR URLLC," 3GPP TSG-RAN#80, Jun. 11-14, 2018, La Jolla, California, 5 pages.
NTT DOCOMO, Inc., "R1-1811348: Enhancements on multi-TRP/panel transmission," 3GPP TSG RAN WG1 Meeting #94bis, Oct. 8-12, 2018, Chengdu, China, 21 pages.
International Search Report and Written Opinion for International Patent Application No. PCT/IB2019/059412, dated Mar. 17, 2020, 15 pages.
International Preliminary Report on Patentability for International Patent Application No. PCT/IB2019/059412, dated Dec. 7, 2020, 9 pages.
LG Electronics, "R1-155367: Discussion on PDSCH transmission for MTC," 3GPP TSG RAN WG1 Meeting #82, Oct. 5-9, 2015, Malmo, Sweden, 8 pages.
First Office Action for Chinese Patent Application No. 201980087705. 2, dated Jul. 27, 2023, 8 pages.

* cited by examiner

SYSTEMS AND METHODS FOR SIGNALING PDSCH DIVERSITY BY DETERMINING ASSOCIATIONS BETWEEN DMRS PORTS AND RV's

RELATED APPLICATIONS

This application is a 35 U.S.C. § 371 national phase filing of International Application No. PCT/IB2019/059412, filed Nov. 1, 2019, which claims the benefit of provisional patent application Ser. No. 62/755,115, filed Nov. 2, 2018, the disclosures of which are hereby incorporated herein by reference in their entireties.

TECHNICAL FIELD

The current disclosure relates to Physical Downlink Shared Channel (PDSCH) diversity and how to signal such diversity.

BACKGROUND

The next generation mobile wireless communication system (5G) or new radio (NR) will support a diverse set of use cases and a diverse set of deployment scenarios. The later includes deployment at both low frequencies (below 6 GHz) and very high frequencies (up to 10 s of GHz).

Like in Long Term Evolution (LTE), NR uses CP-OFDM (Cyclic Prefix Orthogonal Frequency Division Multiplexing) in the downlink (i.e., from a network node, New Radio Base Station (gNB), evolved or enhanced NodeB (eNB), or base station, to a User Equipment (UE)). In the uplink (i.e., from UE to gNB), NR supports both CP-OFDM and Discrete Fourier Transform (DFT)-spread OFDM (DFT-S-OFDM). In the time domain, NR downlink and uplink are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe and each slot consists of 14 OFDM symbols.

Data scheduling in NR can be in slot basis as in LTE; an example is shown in FIG. 1 with a 14-symbol slot, where the first two symbols contain a Physical Downlink Control Channel (PDCCH) and the rest contains a Physical Data Channel (PDCH), either PDSCH (Physical Downlink Data Channel) or PUSCH (Physical Uplink Data Channel).

Different subcarrier spacing values are supported in NR. The supported subcarrier spacing values (also referred to as different numerologies) are given by of $\Delta f=(15 \times 2^\alpha)$ kHz where $\alpha$ is a non-negative integer. $\Delta f=15$ kHz is the basic subcarrier spacing that is also used in LTE. The slot durations at different subcarrier spacings are shown in Table 1.

TABLE 1

Slot length at different numerologies.

| Numerology | Slot length | RB BW |
| --- | --- | --- |
| 15 kHz | 1 ms | 180 kHz |
| 30 kHz | 0.5 ms | 360 kHz |
| 60 kHz | 0.25 ms | 720 kHz |
| 120 kHz | 125 µs | 1.44 MHz |
| 240 kHz | 62.5 µs | 2.88 MHz |

In the frequency domain, a system bandwidth is divided into Resource Blocks (RBs), each corresponding to 12 contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one Resource Element (RE).

Downlink transmissions are dynamically scheduled, i.e., in each slot the gNB transmits Downlink Control Information (DCI) over the PDCCH about which UE data is to be transmitted to and which RBs in the current downlink slot the data is transmitted on. PDCCH is typically transmitted in the first one or two OFDM symbols in each slot in NR. The UE data are carried on the PDSCH. A UE first detects and decodes the PDCCH and if the decoding is successful, it then decodes the corresponding PDSCH based on the decoded control information in the PDCCH.

Uplink data transmissions are also dynamically scheduled using PDCCH. Similar to downlink, a UE first decodes uplink grants in the PDCCH and then transmits data over the PUSCH based the decoded control information in the uplink grant such as modulation order, coding rate, uplink resource allocation, etc.

Spatial Multiplexing

Multi-antenna techniques can significantly increase the data rates and reliability of a wireless communication system. The performance can be improved if both the transmitter and the receiver are equipped with multiple antennas, which results in a multiple-input multiple-output (MIMO) communication channel. Such systems and/or related techniques are commonly referred to as MIMO.

A core component in NR is the support of MIMO antenna deployments and MIMO related techniques. Spatial multiplexing is one of the MIMO techniques used to achieve high data rates in favorable channel conditions. An illustration of the spatial multiplexing operation is provided in FIG. 3.

As seen, the information carrying symbol vector $s=[s\_1, s\_2, \ldots, s\_r]^T$ is multiplied by an NT×r precoder matrix W, which serves to distribute the transmit energy in a subspace of the NT (corresponding to NT antenna ports) dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. The r symbols in s each correspond to a MIMO layer and r is referred to as the transmission rank. In this way, spatial multiplexing is achieved since multiple symbols can be transmitted simultaneously over the same time and frequency resource element (RE). The number of symbols r is typically adapted to suit the current channel properties.

The received signal at a UE with N_R receive antennas at a certain RE n is given by:

$$y_n = H_n W s + e_n$$

where $y_n$ is a $N_R \times 1$ received signal vector, $H_n$ a $N_R \times N_T$ channel matrix at the RE, $e_n$ is a $N_R \times 1$ noise and interference vector received at the RE by the UE. The precoder W can be a wideband precoder, which is constant over frequency, or frequency selective, i.e., different over frequency.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. The transmission rank is also dependent on the Signal to Noise Plus Interference Ratio (SINR) observed at the UE. Typically, a higher SINR is required for transmissions with higher ranks. For efficient performance, it is important that a transmission rank that matches the channel properties as well as the interference is selected. The precoding matrix, the transmission rank, and the channel quality are part of channel state information (CSI), which is typically measured by a UE and fed back to a network node or gNB.

NR MIMO Data Transmission

NR data transmission over multiple MIMO layers is shown in FIG. 4. Depending on the total number of MIMO layers or the rank, either one Code Word (CW) or two codewords is/are used. One code word is used when the total number of layers is equal or less than 4; two codewords are used when the number of layers is more than 4. Each codeword contains the encoded data bits of a Transport Block (TB). After bit level scrambling, the scrambled bits are mapped to complex-valued modulation symbols $d^{(q)}(0), \ldots, d^{(q)}(M_{symb}^{(q)}-1)$ for codeword q. The complex-valued modulation symbols are then mapped onto the layers $x(i)=[x^{(0)}(i) \ldots x^{(v-1)}(i)]^T$, $i=0, 1, \ldots, M_{symb}^{layer}-1$, according to Table 7.3.1.3-1 (which is reproduced below) of 3GPP TS 38.211, where v is the number of layers and $M_{symb}^{layer}$ is the number of modulation symbols per layer.

TABLE 7.3.1.3-1

Codeword-to-layer mapping for spatial multiplexing (reproduced from 3GPP TS 38.211)

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$ | $M_{symb}^{layer} = M_{symb}^{(0)}/4 = M_{symb}^{(1)}/4$ |

TABLE 7.3.1.3-1-continued

Codeword-to-layer mapping for spatial multiplexing (reproduced from 3GPP TS 38.211)

| Number of layers | Number of codewords | Codeword-to-layer mapping $i = 0, 1, \ldots, M_{symb}^{layer} - 1$ |
|---|---|---|
| | | $x^{(6)}(i) = d^{(1)}(4i + 2)$<br>$x^{(7)}(i) = d^{(1)}(4i + 3)$ |

For demodulation purpose, a demodulation reference signal (DMRS), also referred to as a DMRS port, is transmitted along each data layer. The block of vectors $[x^{(0)}(i) \ldots x^{(v-1)}(i)]^T$, $i=0, 1, \ldots, M_{symb}^{layer}-1$ shall be mapped to DMRS antenna ports according to $$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$

where $i=0,1,\ldots,M_{symb}^{ap}-1$, $M_{symb}^{ap}=M_{symb}^{layer}$. The set of DMRS antenna ports $\{p_0, \ldots, p_{v-1}\}$ and port to layer mapping are dynamically indicated in DCI using the Antenna ports field present in DCI according to Tables 7.3.1.2.2-1/2/3/4 in 3GPP TS 38.212.

DMRS Ports

Two types of DMRS ports, Type 1 and Type 2, are defined in NR. Up to 8 DMRS ports are possible with Type 1 DMRS and up to 12 DMRS ports are possible with type 2 DMRS. There are two Code Division Multiplexing (CDM) groups for Type 1 DMRS and three CDM groups for Type 2 DMRS. The DMRS ports to CDM groups mapping are shown in Table 2 and Table 3 for Type 1 and Type 2 DMRS, respectively. It is assumed that DMRS ports within the same CDM group are Quasi Co-Located (QCL) in terms of wireless propagation channel properties.

TABLE 2

DMRS ports to CDM group mapping for Type 1 DMRS.

| DMRS port | CDM group |
|---|---|
| 0 | 0 |
| 1 | 0 |
| 2 | 1 |
| 3 | 1 |
| 4 | 0 |
| 5 | 0 |
| 6 | 1 |
| 7 | 1 |

TABLE 3

DMRS ports to CDM group mapping for Type 2 DMRS.

| DMRS port | CDM group |
|---|---|
| 0 | 0 |
| 1 | 0 |
| 2 | 1 |
| 3 | 1 |
| 4 | 2 |
| 5 | 2 |

TABLE 3-continued

DMRS ports to CDM group mapping for Type 2 DMRS.

| DMRS port | CDM group |
|---|---|
| 6 | 0 |
| 7 | 0 |
| 8 | 1 |
| 9 | 1 |
| 10 | 2 |
| 11 | 2 |

QCL in NR

In LTE and NR, reference signals used for channel estimation are equivalently denoted as antenna ports. Hence the UE can estimate the channel from one antenna port by using the associated Reference Signal (RS). One could then associate a certain data or control transmission with an antenna port, which is equivalent to say that the UE shall use the RS for that antenna port to estimate the channel used to demodulate the associated control or data channel. One could also say that the data or control channel is transmitted using that antenna port.

In LTE and NR, the concept of QCL is used in order to improve the channel estimation performance when demodulating control or data channels. The concept relies on the idea that the UE could estimate long term channel properties from one reference signal in order to tune its channel estimation algorithm. For instance, the average channel delay spread can be estimated using one antenna port and used when demodulating a data channel transmitted using another antenna port. If this is allowed, it is specified that the first and second antenna port are QCL with regard to average channel delay spread.

Hence, as used in LTE and NR specifications, two antenna ports are "quasi co-located" if the large-scale channel properties of the channel over which a symbol on one antenna port is conveyed can be inferred from the channel over which a symbol on the other antenna port is conveyed. The large-scale channel properties preferably include one or more of delay spread, Doppler spread, Doppler shift, average gain, and average delay.

In addition, or alternatively, the large-scale channel properties can include one or more of received power for each port, received timing (i.e., timing of a first significant channel tap), a number of significant channel taps, and frequency shift. By performing channel estimation algorithm tuning based on the RSs corresponding to the quasi co-located antenna ports, a quality of the channel estimation is substantially improved.

In NR, it has been agreed to introduce QCL for spatial properties of the channel on top of those QCL parameters used for LTE. By complementing the existing QCL framework with new QCL parameters that depends on spatial channel properties, a UE is allowed to perform spatial processing across different signal types without violating the rule that a UE is not allowed to use measurements from one reference signal to assist in the reception or processing of another signal unless explicitly specified.

Examples of such spatial processing are analog receiver beamforming and channel estimation using spatial processing gain to improve the channel estimate.

Assume communication between three nodes in a network, two alternative TX nodes and an RX node.

A first TX node transmits a first set of reference signals (RS) from one or multiple transmit antenna ports A RX node receives the transmitted reference signals using one or multiple receive antenna ports and determines or estimates, based on the received first set of transmitted RS, one or more parameters capturing a time, frequency and spatial property of the channel A second TX node transmits a second set of reference signals (RS) from one or multiple transmit antenna ports A RX node receives the transmitted reference signals using one or multiple receive antenna ports and determines or estimates, based on the received second set of transmitted RS, one or more parameters capturing a time, frequency and spatial property of the channel A PDCCH is transmitted from the first node (always) and indicates either the first or the second set of RS as the reference for a PDSCH transmission. Assume in this example that the second set is signaled in the PDCCH.

The RX node receives an indication that the PDSCH DMRS transmitted from one or multiple transmit antenna ports are quasi co-located (QCL) with the said second RS, where the QCL is given with respect to the one or more parameters capturing a time and frequency and spatial property of the channel The TX node transmits PDSCH from the second node.

The RX node utilizes one or more of the determined parameters capturing a spatial property of the channel that is based on the second set of RS, to assist in the reception of the PDSCH In other words, the RX node, typically a UE, can use the same channel estimation filter and RX beamforming weights to receive the PDSCH and associated DMRS as the filter and RX beamforming weights it used when it received a second signal (for example a measurement signal, e.g., CSI-RS) if the PDSCH DMRS is QCL with the second RS with respect to spatial parameters.

Spatial parameters could be angle of arrival, angular spread or spatial correlation, spatial correlation matrix on the RX side or on the TX side.

In NR, a UE can be preconfigured with up to 128 Transmission Configuration Indication (TCI) states and each state contains one or two RSs as source for the QCL. A Medium Access Control (MAC) Control Element (CE) for 'TCI Activation/Deactivation for UE-specific PDSCH' is used to activate or downselect up to 8 TCI states. For PDSCH transmission, one of the down-selected/activated TCI states is indicated by the TCI filed present in DCI format 1_1 to indicate the QCL relations for PDSCH transmission.

Data Transmission Over Multiple Transmission Points or Panels

In NR Release-15, Dynamic Transmission Point Selection (DPS) is supported in which data for a UE can be sent over different Transmission Points (TRPs) in different slots. Since the different TRPs may be physically in different locations, the propagation channels to the UE can also be different. To facilitate receiving PDSCH data from different TRPs, as discussed above, TCI state is signaled to a UE in the corresponding DCI carried on PDCCH. A TCI state contains Quasi Co-location (QCL) information between the DMRS for PDSCH and one or two DL reference signals such as a Channel State Information Reference Signal (CSI-RS) or Synchronization Signal Block (SSB). The supported QCL information types in NR are:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The QCL information is used by a UE to apply channel properties associated with the DL reference signals (CSI-RS or SSB) to DMRS based channel estimation for PDSCH reception.

DMRS Port Group

To support data transmission over multiple TRPs, separate DMRS ports would be transmitted from different TRPs. These DMRS ports would experience different propagation channels. For proper demodulation at the UE, the UE needs to know the association between a DMRS port and a TRP. For that purpose, the DMRS ports may be organized into port groups such that the ports in the same group can be transmitted from the same TRP. One way to organize the DMRS ports would be based on the CDM groups, i.e., a CDM group corresponds to a DMRS group.

Redundancy Versions

In NR, four redundancy versions (RVs) are defined (namely RV0, RV1, RV2, and RV3). Each redundancy version is defined as the bits that can be read out of a circular buffer with different starting points. In NR, the starting points in the circular buffer for RV0 and RV3 are chosen such that both RV0 and RV3 are self decodable. Generally, the initial transmission of a transport block uses RV0, and retransmissions of the transport block can use RV0, RV1, RV2, or RV3. The different RVs can be used by the UE for soft combining at its receiver to improve the decodability of the received TB. In NR, a 2 bit RV field in included in DCI to indicate the redundancy version associated with PDSCH transmission. This 2-bit field indicates one of RV0, RV1, RV2, or RV3.

URLLC Use Cases

In NR Rel-16, a study item on Enhanced Ultra Reliable Low Latency Communication (eURLLC) was approved. This study item considers use cases with potentially different reliability requirements. In some of the use cases, strict reliability requirements of $10^{-6}$ probability of incorrect received data packet are needed as discussed in. It should be noted that the techniques from different layers of the protocol stack can contribute to enhancing overall reliability of delivered packet. For instance, higher layer reliability enhancement via Packet Data Convergence Protocol (PDCP) duplication can be utilized to enhance reliability for these use cases. In addition, solutions to enhance physical layer reliability may also need to be investigated to meet the stringent reliability requirement of $10^{-6}$. In addition, the URLLC use cases also may have stringent latency requirements.

When the network is equipped with multiple Transmission-Reception Points (TRPs), one of the techniques that can be effective in improving reliability with low latency is to rely on PDSCH spatial diversity by utilizing transmissions of a packet from more than one TRP to the same UE. One way of achieving such PDSCH diversity is to transmit different redundancy versions (RVs) of the same transport block (TB) from the different TRPs. FIG. 5 illustrates an example with three TRPs where redundancy versions RV0, RV1, and RV2 are transmitted to the UE from TRP1, TRP2, and TRP3, respectively. In this way, both coding diversity (by multiple RVs) and spatial diversity (by multiple TRPs) is achieved simultaneously. In this example, the PDCCH carrying the DCI that schedules the PDSCH diversity transmission is sent to the UE from TRP1. It is also assumed that the scheduler is connected to the different TRPs via an ideal backhaul with very low latency, which is a reasonable assumption for URLLC scenarios with low latency requirements. Although the scheduler is shown to be separated from the TRPs, it is generally understood that the scheduler can be part of one of the TRPs. Once the UE receives the different RVs from the different TRPs over the wireless channel, the UE can perform joint reception of the different versions of the same TB, for example soft combining at its receiver to improve the reliability of received TB.

There currently exist certain challenge(s). In the PDSCH diversity scheme with multiple RVs of the TB being transmitted from different TRPs, one of the requirements is to successfully decode the TB within very stringent latency requirements. Hence, the UE typically has to receive a single-DCI that schedules the different redundancy versions from the different TRPs. It is an open problem of how to signal the single-DCI that schedules the multiple redundancy versions from different TPRs to the UE.

SUMMARY

Systems and methods for signaling for Physical Downlink Shared Channel (PDSCH) diversity are provided. In some embodiments, a method performed by a wireless device for receiving a plurality of downlink transmissions includes determining an association between one or more Demodulation Reference Signal (DMRS) ports and one or more associated Redundancy Values (RVs); and receiving the plurality of downlink transmissions using the association. In some embodiments, this enables a single Downlink Control Information (DCI) to be used to schedule different redundancy versions of the same transport block from the different Transmission Reception Points (TRPs) which helps improve reliability of decoding the TB successfully within stringent latency requirements.

Certain aspects of the present disclosure and their embodiments may provide solutions to the aforementioned or other challenges. This disclosure proposes several embodiments of jointly signaling DMRS port group(s) and RV(s) to a wireless device for URLLC with multiple TRP transmission involving stringent reliability and latency requirements. The embodiments involve an association between one or more DMRS port groups and one or more RV(s) to be transmitted from different TRPs. Furthermore, the embodiments involve a triggering of a single DCI using one or more of the fields defined in the DCI to signal the one or more DMRS port group(s) and the one or more associated RV(s).

Embodiment A: A method of joint signaling of DMRS port group(s) and associated RV(s) to a wireless device comprising: an association between one or more DMRS port group(s) and one or more associated RV(s), and a triggering of a single DCI using one or more of the fields defined in the DCI to signal the one or more DMRS port group(s) and the one or more associated RV(s).

Embodiment B: The method of embodiment A wherein the predefined association between one or more DMRS port group(s) and one or more associated RV(s) is RRC configured as part of an extended Transmission Configuration Indication (TCI) state consisting of a TCI state or TCI state ID corresponding to each DMRS port group.

Embodiment C: The method of embodiment A wherein the predefined association between one or more DMRS port group(s) and one or more associated RV(s) is Radio Resource Control (RRC) configured as part of a TCI state consisting of one or more Downlink (DL) Reference Signals (RSs) for Quasi Co-Location (QCL) purposes and an associated QCL type corresponding to each DMRS port group.

Embodiment D: The method of any of embodiments A-C wherein the TCI field in a single DCI is used to signal the one or more DMRS port group(s) and the one or more associated RV(s).

Embodiment E: The method of any of embodiments A-D wherein the RV corresponding to the first DMRS port group is provided by the RV field, and the RVs corresponding to the remaining DMRS port groups are indicated by the TCI field.

Embodiment F: The method of embodiment A wherein the predefined association between one or more DMRS port group(s) and one or more associated RV(s) is defined per codepoint of the Antenna ports field.

Embodiment G: The method of any of embodiments A and E wherein the Antenna ports field in a single DCI is used to signal the one or more DMRS port group(s) and the one or more associated RV(s).

Embodiment H: The method of any of embodiments A, E, and G wherein the RV corresponding to the first DMRS port group is provided by the RV field, and the RVs corresponding to the remaining DMRS port groups are indicated by the Antenna ports field.

Embodiment I: The method of any of embodiments A-E, wherein the MAC CE for 'TCI State Activation/Deactivation for User Equipment (UE)-specific PDSCH' can be used to downselect candidate TCI states or extended TCI states to be mapped to the codepoints of the TCI field.

There are, proposed herein, various embodiments which address one or more of the issues disclosed herein. In some embodiments, a method performed by a wireless device for receiving a plurality of downlink transmissions comprises determining an association between one or more DMRS ports and one or more associated Redundancy Values (RV); and receiving the plurality of downlink transmissions using the association.

In some embodiments, determining the association comprises determining that the one or more DMRS ports belong to one or more DMRS port groups and the association is between a DMRS port group and a certain RV.

In some embodiments, the association is determined by one or more of the group consisting of: configured by higher layers; dynamically indicated by Downlink Control Information (DCI); dynamically indicated by Medium Access Control (MAC) Control Elements (CEs); and/or defined by a specification. In some embodiments, receiving the plurality of downlink transmissions using the association includes decoding one or more Physical Downlink Shared Channel (PDSCH) layers or PDSCH codeword(s) from a certain Transmission/Reception Point (TRP) where which RV was used is known due to the association with the DMRS port group transmitted by the certain TRP.

In some embodiments, a Transmission Configuration Indication (TCI) state or TCI state Identifier (ID) is also associated with the DMRS port group and the associated RV.

In some embodiments, the method also includes receiving a DCI scheduling the plurality of downlink transmissions indicating which TCI state or set of TCI states the wireless device shall use for demodulating the plurality of downlink transmissions.

In some embodiments, the DMRS port group and the associated RV (along with the TCI state/TCI state ID) is indicated by a codepoint in a DCI field of the DCI, e.g., the TCI state indication field. In some embodiments, the TCI field in DCI format 1_1 is used for joint signaling of the DMRS port group(s) and the associated RV(s). In some embodiments, a new DCI field is introduced in DCI format 1_1 for joint signaling of the DMRS port group(s) and the associated RV(s). In some embodiments, determining the association comprises receiving Radio Resource Control (RRC) signaling indicating the association. In some embodiments, DMRS port group(s) and the associated RV(s) are indicated via an antenna ports field present in Downlink Control Information (DCI) format 1_1.

In some embodiments, when the antenna ports field takes on a subset of values allowed for the antenna ports field such as 9-11, the wireless device receives a downlink transmission from two Transmission/Reception Point (TRPs) with one DMRS port group and RV associated with each TRP. In some embodiments, the DMRS port groups are indicated via the antenna ports field while the RV corresponding to a first DMRS port group is provided by an RV field. In some embodiments, the RVs corresponding to the remaining DMRS port groups are indicated by the antenna ports field.

In some embodiments, the DMRS port groups are indicated via a Transmission Configuration Indication (TCI) field while the RV corresponding to a first DMRS port group is provided by an RV field. In some embodiments, the RVs corresponding to the remaining DMRS port groups are defined in a TCI state or an extended TCI state and are indicated by the TCI field. In some embodiments, determining the association comprises a pre-defined ordered list of RVs.

In some embodiments, if a single DMRS group is used, then a first RV from the list is used; if two DMRS groups are used, then the first and a second RV value from the list are used. In some embodiments, the interpretation of the RV field is extended to select a list of RVs; multiple DMRS groups are used and the multiple DMRS groups use the RV in the list in an ordered manner. In some embodiments, the method also includes receiving a MAC CE to downselect candidate TCI states or the extended TCI states to be mapped to codepoints of the TCI field. In some embodiments, the MAC CE is 'TCI State Activation/Deactivation for UE-specific PDSCH'.

In some embodiments, the method also include providing user data; and forwarding the user data to a host computer via the transmission to the base station Certain embodiments may provide one or more of the following technical advantage(s). The main benefit of the solutions described in this disclosure is that a single DCI can be used to schedule different redundancy versions of the same transport block from the different TRPs which helps improve reliability of decoding the TB successfully within stringent latency requirements.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
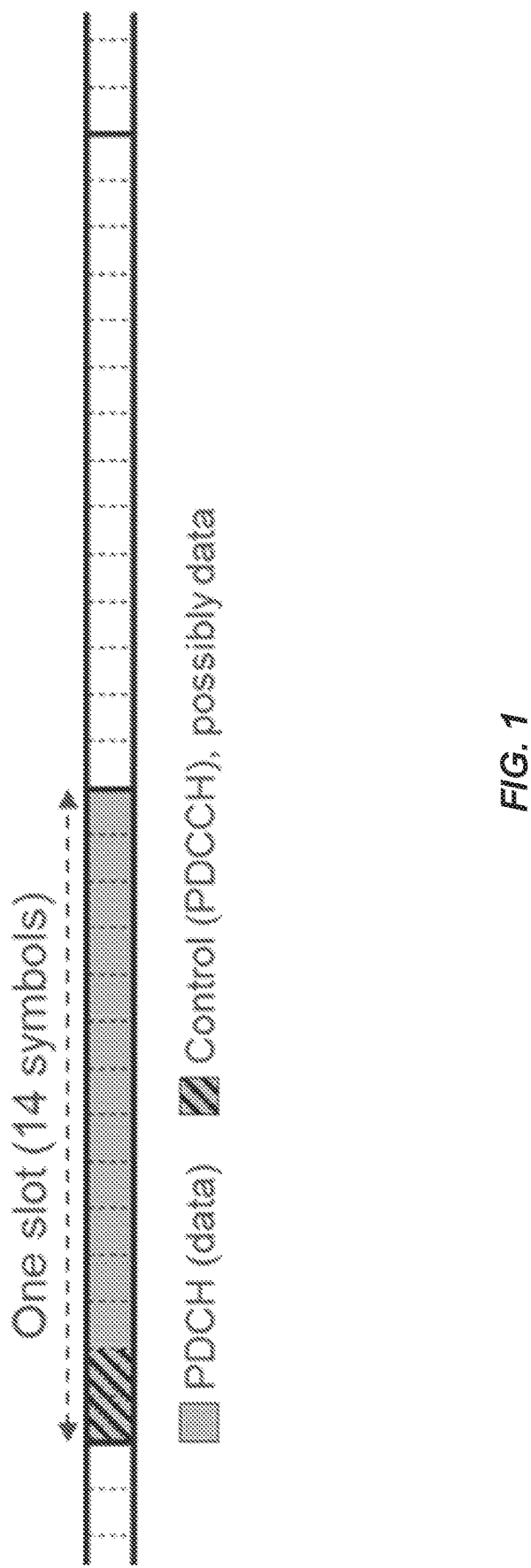
FIG. 1 illustrates data scheduling in NR on a slot basis as in LTE, according to some embodiments of the present disclosure.
Figure 2:
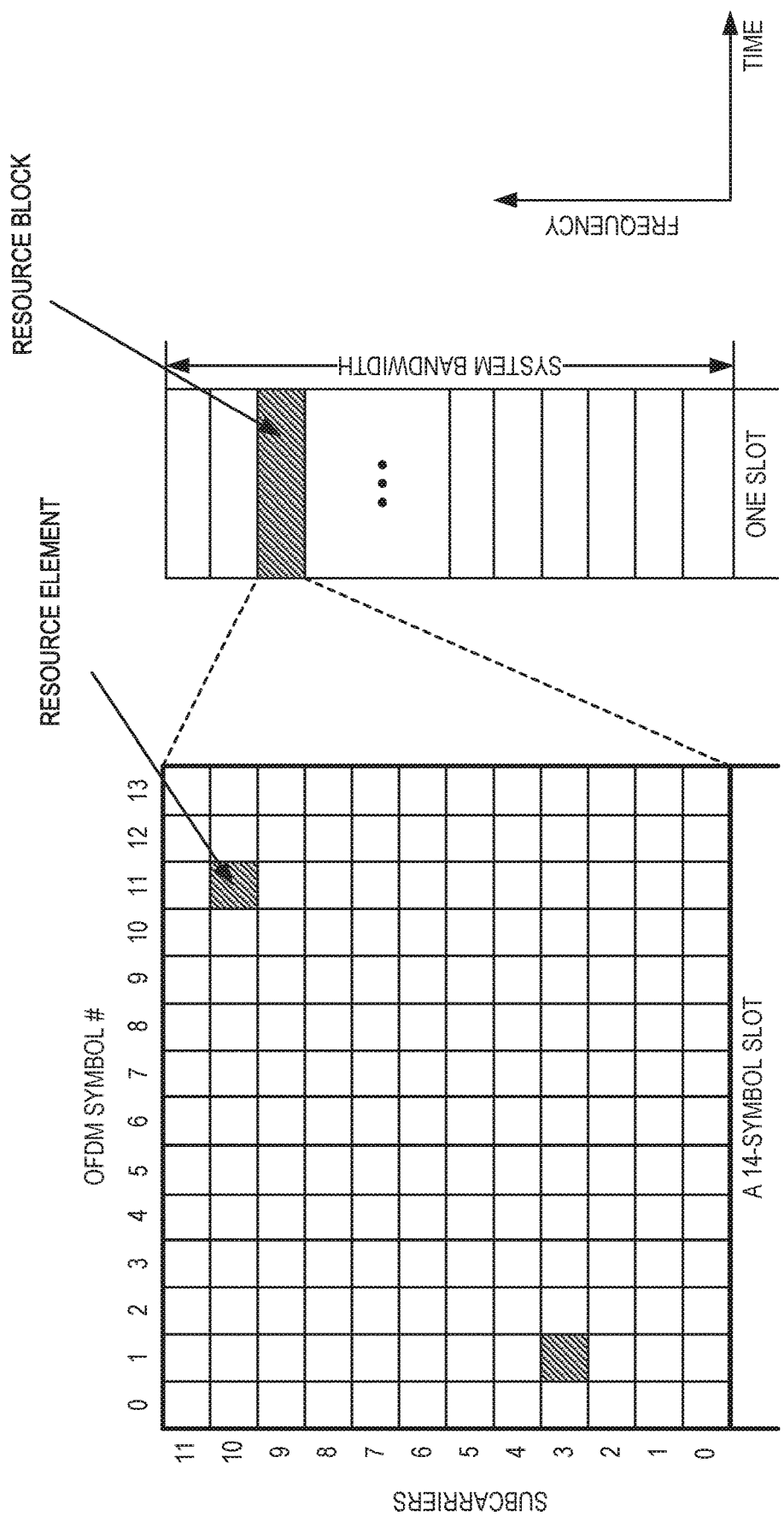
FIG. 2 illustrates a basic NR physical time-frequency resource grid, according to some embodiments of the present disclosure.
Figure 3:
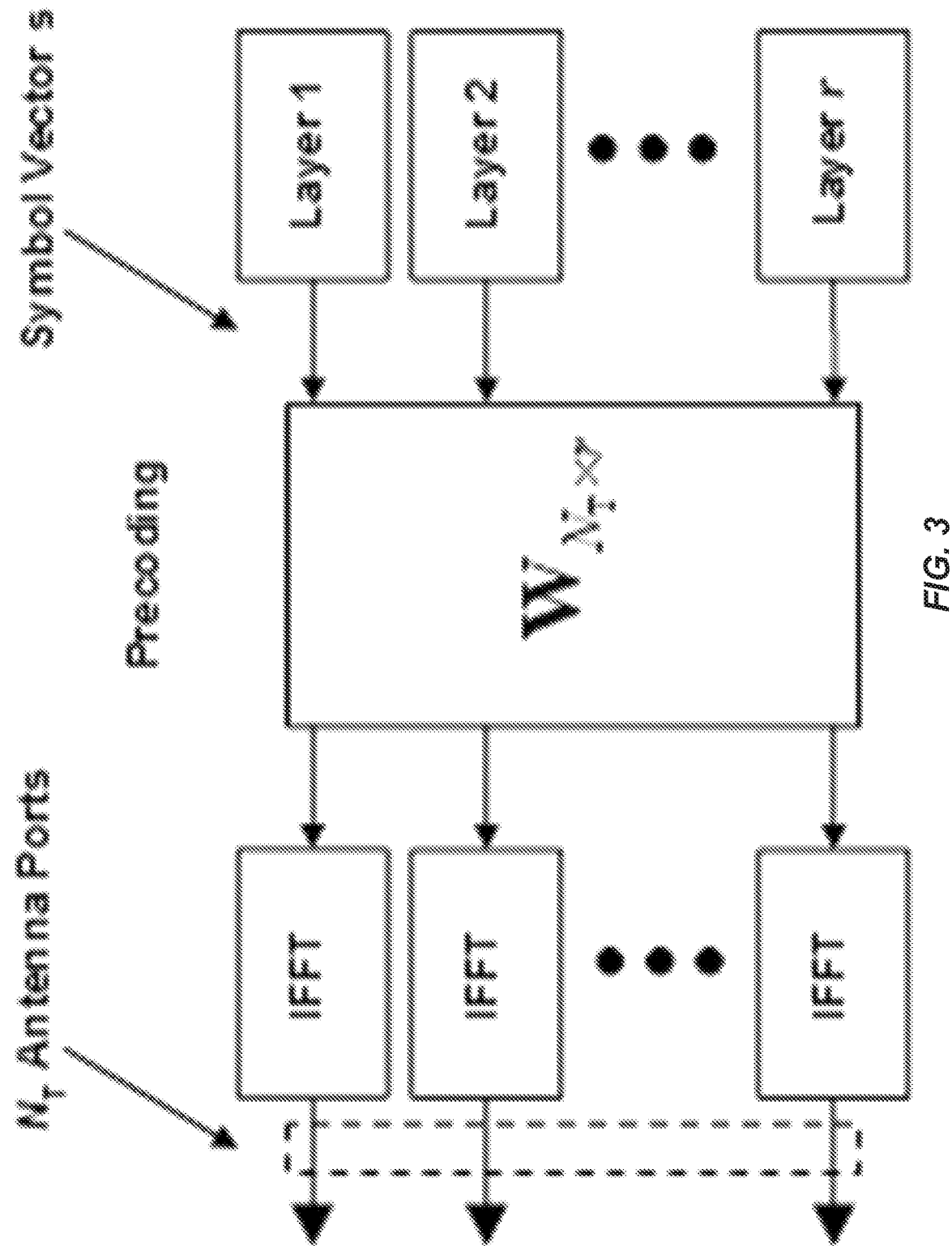
FIG. 3 illustrates a MIMO spatial multiplexing operation, according to some embodiments of the present disclosure.
Figure 4:
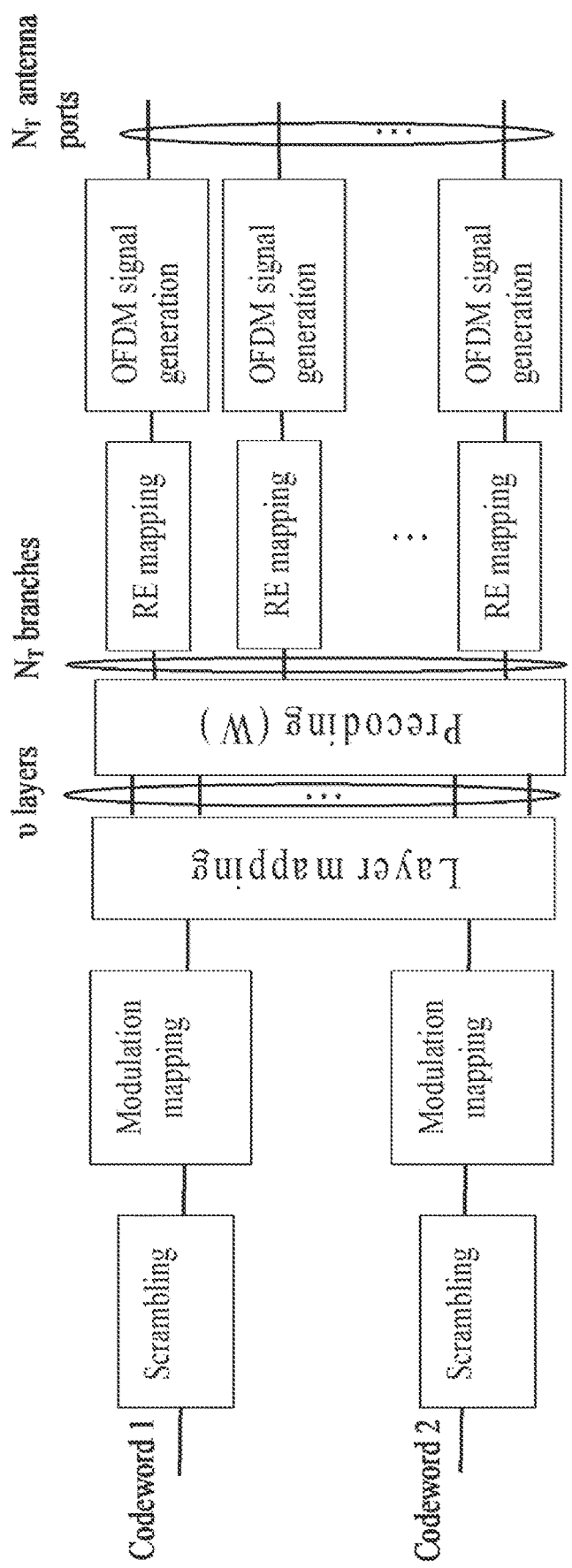
FIG. 4 illustrates NR data transmission over multiple MIMO layers, according to some embodiments of the present disclosure.
Figure 5:
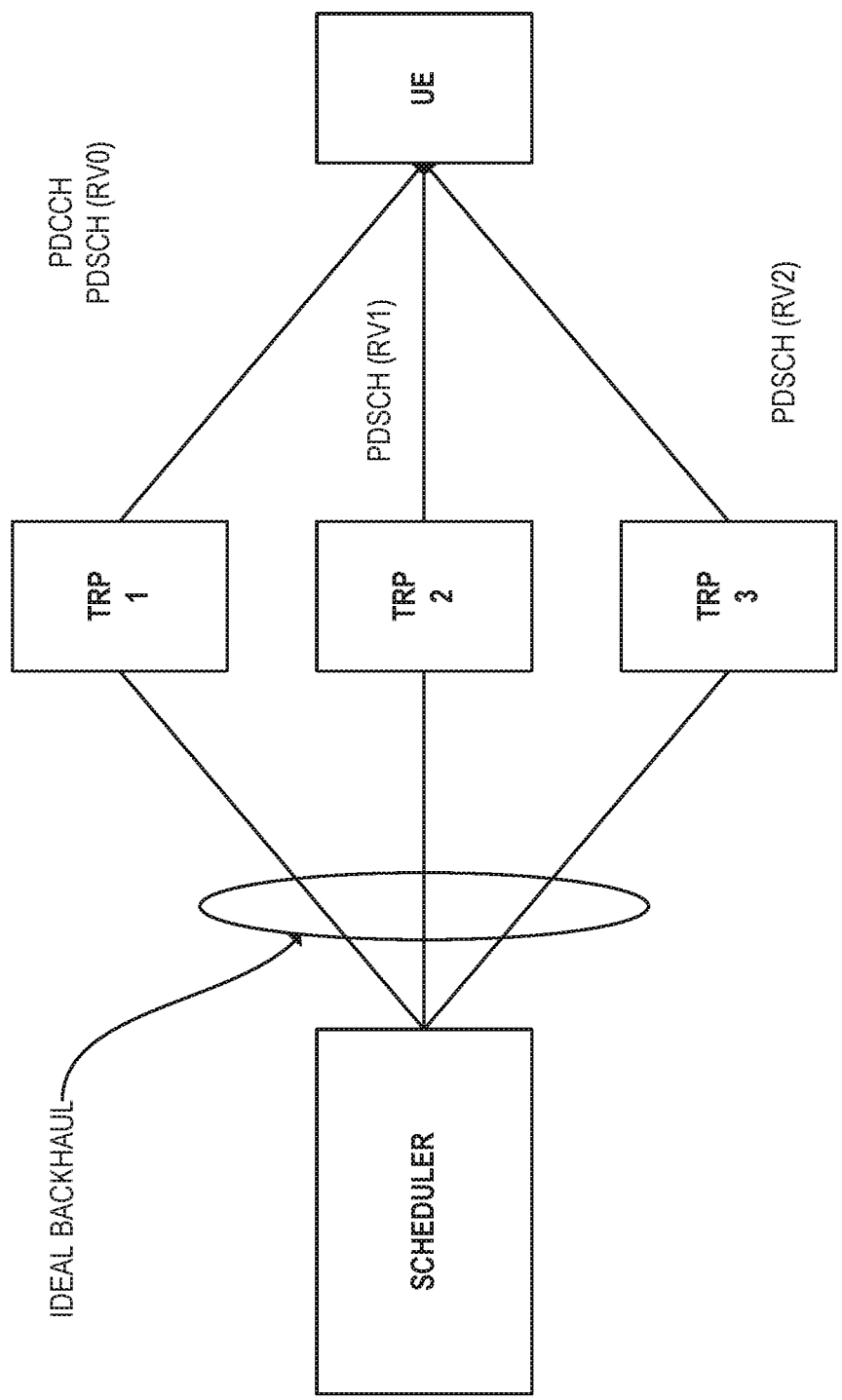
FIG. 5 illustrates an example with three TRPs where redundancy versions RV0, RV1, and RV2 are transmitted to the UE from TRP1, TRP2, and TRP3, respectively, according to some embodiments of the present disclosure.
Figure 6:
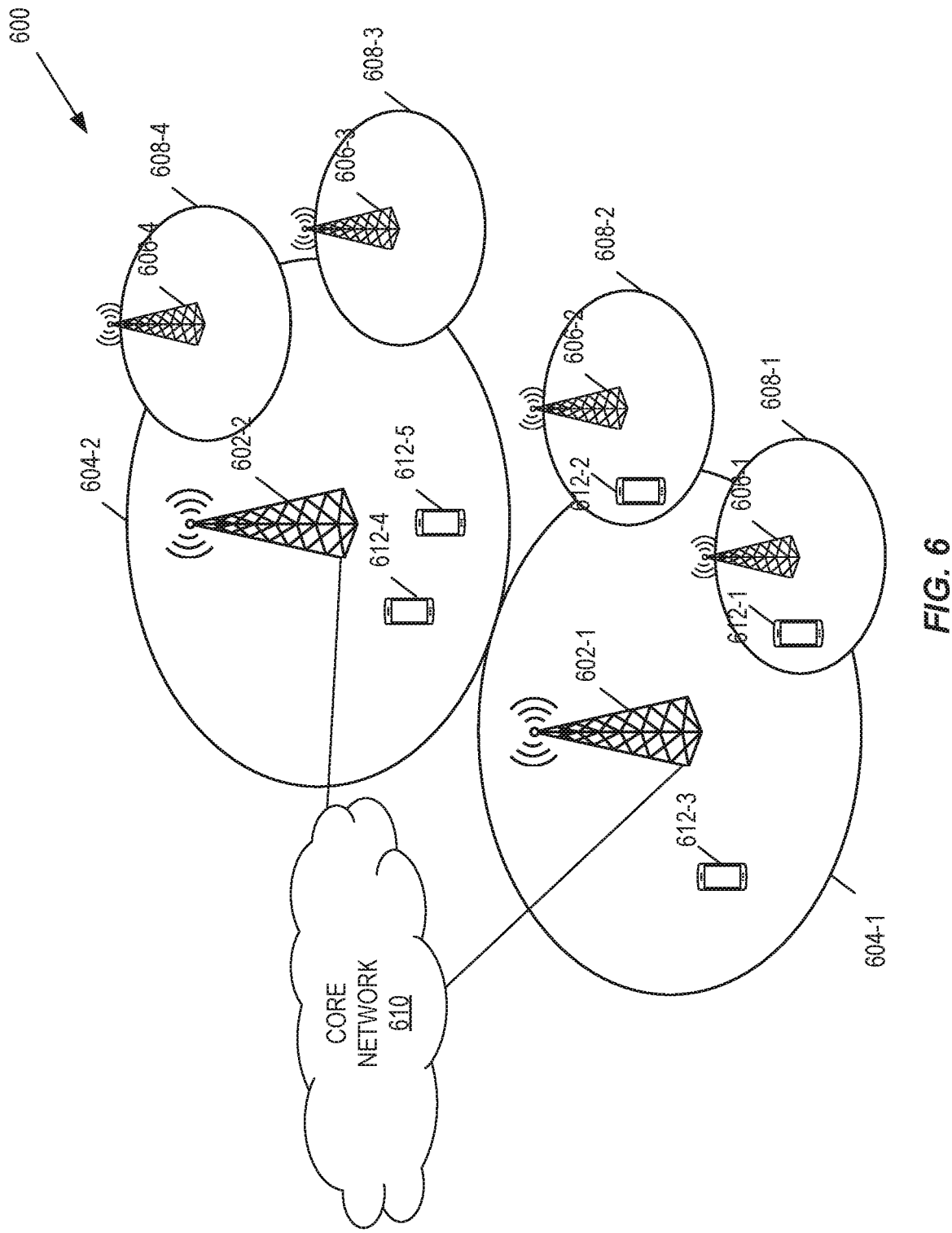
FIG. 6 illustrates one example of a cellular communications network, according to some embodiments of the present disclosure.

FIG. 6 illustrates one example of a cellular communications network 600 according to some embodiments of the present disclosure. In the embodiments described herein, the cellular communications network 600 is a 5G NR network. In this example, the cellular communications network 600 includes base stations 602-1 and 602-2, which in LTE are referred to as eNBs and in 5G NR are referred to as gNBs, controlling corresponding macro cells 604-1 and 604-2. The base stations 602-1 and 602-2 are generally referred to herein collectively as base stations 602 and individually as base station 602. Likewise, the macro cells 604-1 and 604-2 are generally referred to herein collectively as macro cells 604 and individually as macro cell 604. The cellular communications network 600 may also include a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The base stations 602 (and optionally the low power nodes 606) are connected to a core network 610.

The base stations 602 and the low power nodes 606 provide service to wireless devices 612-1 through 612-5 in the corresponding cells 604 and 608. The wireless devices 612-1 through 612-5 are generally referred to herein collectively as wireless devices 612 and individually as wireless device 612. The wireless devices 612 are also sometimes referred to herein as UEs.

Embodiment 1: Joint Signaling of DMRS Port Group(s) and Associated RV(s) Via the TCI Field In this embodiment, the DMRS ports configured to the UE belong to groups and an association between a DMRS port group and a certain RV is either configured by higher layers, dynamically indicated by DCI or MAC CE, given by specifications or a combination of these.

Hence in an implementation with multiple TRPs, multiple DMRS port groups are used for the PDSCH transmission and each group can be associated with a transmission from a certain TRP. When UE decodes PDSCH layers or PDSCH codeword(s) from a certain TRP, it also knows which RV was used due to the association with the DMRS group.

In a further embodiment, a TCI state or TCI state ID may also be associated with the DMRS port group and the associated RV. Which TCI state or set of TCI states the UE shall use for demodulating the PDSCH is indicated to the UE in the DCI that schedules the PDSCH.

With this TCI state association, the DMRS port group and the associated RV (along with the TCI state/TCI state ID) can be indicated by a codepoint in a DCI field to the UE, e.g., the TCI state indication field.

In some embodiments, the association between DMRS port group(s) and RV(s) are configured to the UE via at least RRC signaling. In some further embodiments, the TCI field in DCI format 1_1 is used for joint signaling of DMRS port group(s) and associated RV(s). Alternatively, a new DCI field is introduced in DCI format 1_1 for joint signaling of DMRS port group(s) and associated RV(s).

There are multiple specific ways of associating a DMRS port group with a RV to be transmitted from a TRP. Some examples are given below:

In one example, an extended TCI state can be defined which contains associations between RVs, DMRS port groups, and/or TCI states/TCI state IDs. One such definition is exemplified in FIG. 7. In this example figure, three different DMRS port groups are defined with each DMRS port group corresponding to a different TRP. The three different DMRS port groups are each associated with a different RV. Additionally, the extended TCI state can also include a TCI State or TCI State ID associated with each DMRS port group.

Figure 7:
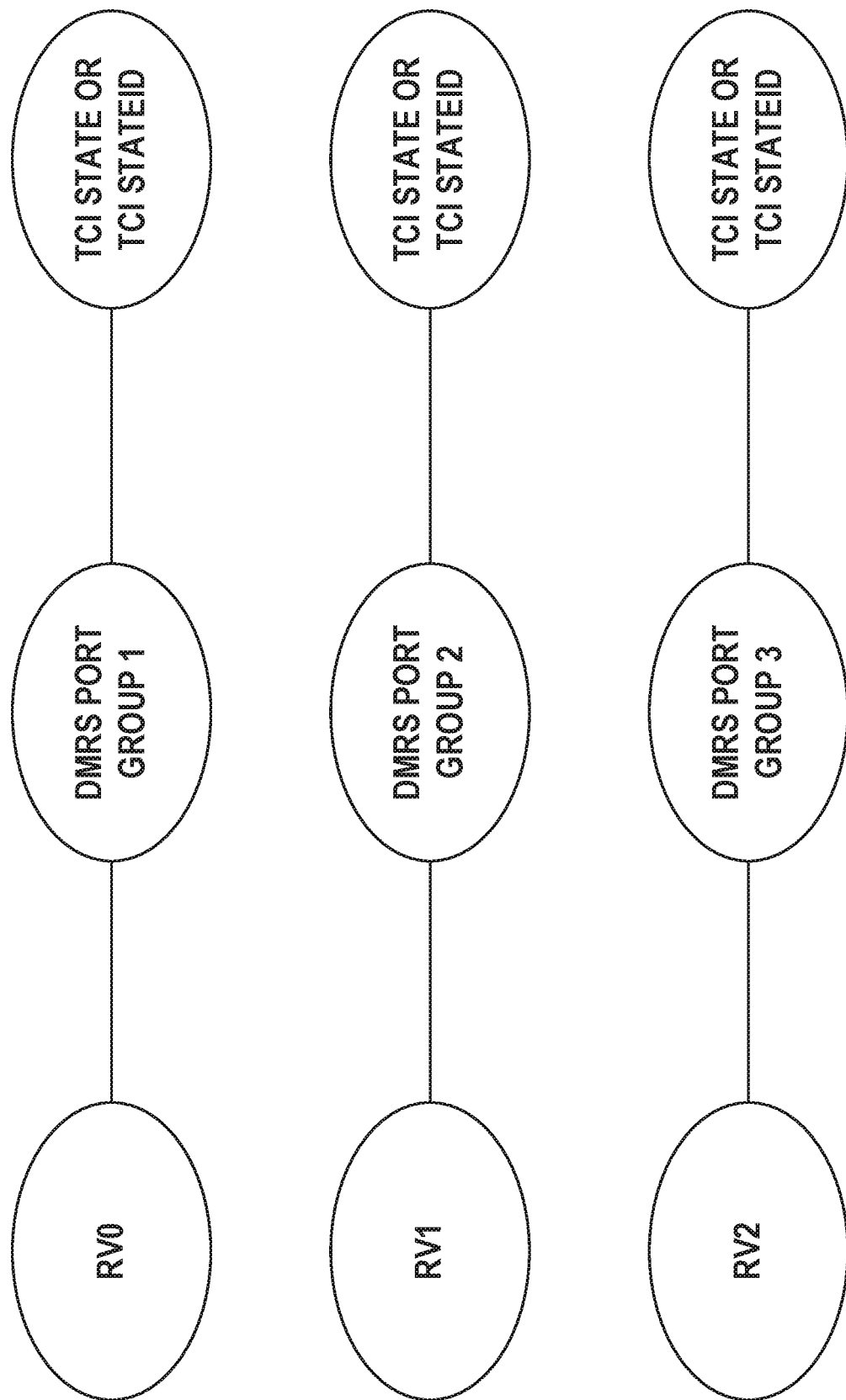
FIG. 7 illustrates an extended TCI state which contains associations between RVs, DMRS port groups, and/or TCI states/TCI state IDs, according to some embodiments of the present disclosure.
Figure 8:
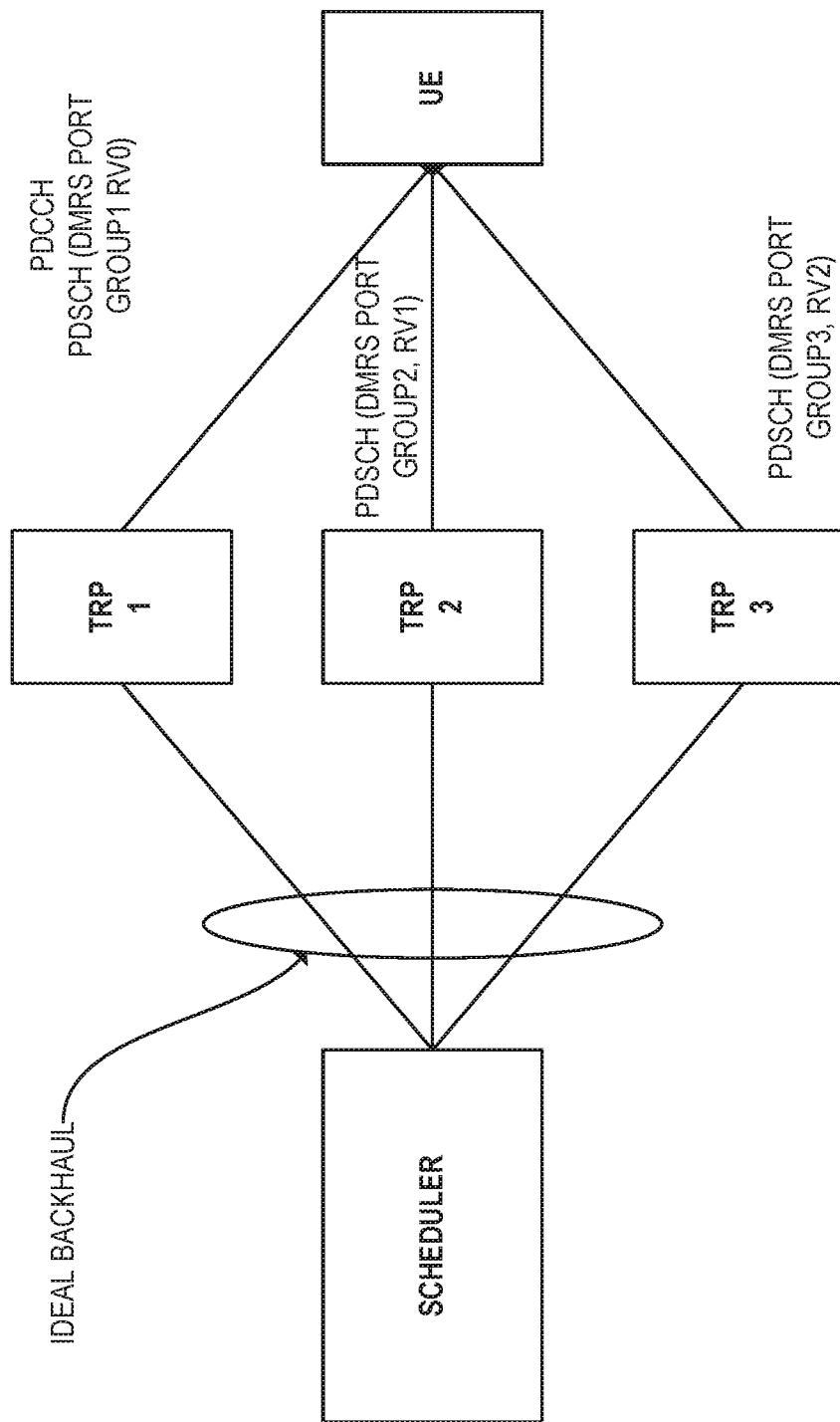
FIG. 8 shows the PDSCH transmission when the example extended TCI state of FIG. 7 is triggered by a single codepoint of a DCI field to the UE, according to some embodiments of the present disclosure.

FIG. 8 shows the PDSCH transmission when the example extended TCI state of FIG. 7 is triggered by a single codepoint of a DCI field to the UE. In this example, the PDCCH is transmitted from TRP1 carrying a trigger of the extended TCI state in FIG. 7 via a single codepoint of a DCI field. According to the associations defined in the extended TCI state in FIG. 7, the following are transmitted from each TRP:

RV0 and DMRS port group 1 are transmitted from TRP1
RV1 and DMRS port group 2 are transmitted from TRP2
RV2 and DMRS port group 3 are transmitted from TRP3

While the example in FIGS. 7 and 8 illustrate one specific extended TCI with a specific association pattern of DMRS port group(s) and RV(s), any desired DMRS port group to RV association can be predefined to the UE via RRC signaling. Each such desired association will be defined in a different extended TCI state and can be indicated via one of the codepoints in a single DCI field.

It is noted that it is always desirable to transmit RV0 or RV3 since only RV0 and RV3 are self-decodable, e.g., RV1 and RV2 cannot alone decode a TB. Therefore, the used RV need to dynamically depend on the used DMRS group. For example, if only one TRP is used in the transmission, the solution must ensure that RV0 or RV3 is used for that transmission. Therefore, a static DMRS group to RV mapping is undesirable as it disables dynamic point selection (i.e., transmitting from either TRP1 or TRP2 or TRP3 with static RV mapping, only would imply using RV0, RV1 and RV2 which prohibits possible decoding of dynamic point selection from TRP2 or TRP3). Hence, a more elaborate scheme is proposed where for example the DMRS group with lowest index is always associated with RV0 or RV3 and the other DMRS groups, if present in the actual PDSCH scheduling, use alternative RVs. In summary, the RV associated to a certain DMRS group is dynamic and depends on which and how many DMRS groups are used for the actual PDSCH transmission and reception.

Table 4 shows an example where each codepoint in the TCI state field is used to trigger one of the extended TCI states which contain different number of DMRS port groups with associated RVs. Codepoint 000 triggers an extended TCI state which contains only a single DMRS port group with an associated redundancy version of RV0. This corresponds to the case where a TB with RV0 is transmitted from a single TRP corresponding to DMRS port group 1. Codepoint 110 triggers an extended TCI state which contains three DMRS port groups with 3 different RVs, which corresponds to the transmission of a single TB from three different TRPs with different RVs. Note that each DMRS port group may also have an associated TCI state ID which is not shown in Table 4 for the sake of simplicity. With this signaling framework, dynamic switching between single TRP transmission and multi-TRP transmission with PDSCH diversity is possible.

TABLE 4

An example of jointly triggering different DMRS port group(s) and associated RV(s) via different codepoints of a single DCI field

| Codepoint in TCI State | Extended TCI State | RRC configured DMRS port groups, associated RVs, and TCI State IDs |
| --- | --- | --- |
| 000 | 0 | {DMRS port group 1, RV0} |
| 001 | 1 | {DMRS port group 2, RV0} |
| 010 | 2 | {DMRS port group 1, RV0}, {DMRS port group 2, RV3} |
| 011 | 3 | {DMRS port group 1, RV0}, {DMRS port group 3, RV3} |
| 100 | 4 | {DMRS port group 1, RV0}, {DMRS port group 4, RV3} |
| 101 | 5 | {DMRS port group 2, RV0}, {DMRS port group 3, RV3} |
| 110 | 6 | {DMRS port group 1, RV0}, {DMRS port group 2, RV1}, {DMRS port group 3, RV3} |

TABLE 4-continued

An example of jointly triggering different DMRS port group(s) and
associated RV(s) via different codepoints of a single DCI field

| Codepoint in TCI State | Extended TCI State | RRC configured DMRS port groups, associated RVs, and TCI State IDs |
|---|---|---|
| 111 | 7 | {DMRS port group 1, RV0}, {DMRS port group 2, RV1}, {DMRS port group 3, RV2}, {DMRS port group 4, RV3} |

Another alternative way of associating a DMRS port group with a RV is by defining multiple DMRS port groups inside the TCI-State. Each DMRS port group can have an associated QCL-Info which defines a DL RSs for QCL purposes and an associated QCL type. In addition to the QCL-Info, an associated RV can also be defined for each DMRS port group inside the TCI-State. This structure is an alternative to the extended TCI structure shown in FIG. 7, and can be used joint triggering using a single DCI field by replacing the 'Extended TCI State ID' by the 'TCI-StateId' in Table 4.

Embodiment 2: Joint Signaling of DMRS Port Group(s) and Associated RV(s) Via the Antenna Ports Field In this embodiment, DMRS port group(s) and the associated RV(s) are indicated via the antenna ports field present in DCI format 1_1. An example for the case with DMRS-Type 1 with a single DMRS symbol (i.e., maxLength=1) is given in Table 5. In this example, the original table given in Table 7.3.1.2.2-1 of 3GPP TS 38.212 V15.3.0 is extended to include the DMRS port group(s) and the associated RV(s). Note that the DMRS ports belonging to the same DMRS port group are included within { } and different DMRS port groups are separated by ','. Only a single RV per DMRS port group is assumed in this example where RV(s) associated with different DMRS port groups are separated by ','. It should be noted that this embodiment can also be extended to the case where two RV(s) are associated with a DMRS port group containing more than one port.

In the example of Table 5, when the antenna ports field takes on values of 0-8, the UE receives a PDSCH transmission from a single TRP with one DMRS port group and one associated RV. When the antenna ports field takes on values of 9-11, the UE receives a PDSCH transmission from two TRPs with one DMRS port group and RV associated with each TRP.

In this embodiment, the TCI state associated with each DMRS port group will be by the TCI field. For instance, when the antenna ports field indicates two DMRS port groups, the TCI field will indicate the associated TCI state(s) or QCL information for the two DMRS port groups.

TABLE 5

An example of joint signaling of DMRS port group(s) and associated
RV(s) via the Antenna port field for dmrs-Type = 1 and maxLength = 1
(original table given in Table 7.3.1.2.2-1 of 3GPP TS 38.212 V15.3.0)
One Codeword:
Codeword 0 enabled,
Codeword 1 disabled

| Value | Number of DMRS CDM group(s) without data | DMRS port(s) | DMRS port group(s) | RV(s) |
|---|---|---|---|---|
| 0 | 1 | 0 | {0} | {RV0} |
| 1 | 1 | 1 | {1} | {RV0} |
| 2 | 1 | 0,1 | {0,1} | {RV0} |
| 3 | 2 | 0 | {0} | {RV0} |
| 4 | 2 | 1 | {1} | {RV0} |
| 5 | 2 | 2 | {2} | {RV0} |
| 6 | 2 | 3 | {3} | {RV0} |
| 7 | 2 | 0,1 | {0,1} | {RV0} |
| 8 | 2 | 2,3 | {2,3} | {RV0} |
| 9 | 2 | 0-2 | {0,1}, {2} | {RV0}, {RV3} |
| 10 | 2 | 0-3 | {0,1}, {2,3} | {RV0}, {RV3} |
| 11 | 2 | 0,2 | {0}, {2} | {RV0}, {RV3} |
| 12-15 | Reserved | Reserved | Reserved | Reserved |

Embodiment 3: Joint Signaling of DMRS Port Group(s) and Associated RV(s) Via the Antenna Ports/TCI Field and RV Field In this embodiment, the DMRS port groups are indicated via the Antenna port field similar to Embodiment 2, while the RV corresponding to the first DMRS port group is provided by the RV field. The RVs corresponding to the remaining DMRS port groups will be indicated by the Antenna port field.

In an alternative embodiment, the DMRS port groups are indicated via the TCI field similar to Embodiment 1, while the RV corresponding to the first DMRS port group is provided by the RV field. The RVs corresponding to the remaining DMRS port groups are defined in the TCI state or extended TCI state similar to Embodiment 1 and will be indicated by the TCI field.

Yet another alternative is to pre-define an ordered list of RVs, e.g., {RV0, RV3, RV2, RV1}. If a single DMRS group is used for PDSCH (e.g., indicated by a TCI state), then the first RV from the list is used. If two DMRS groups are used, then the first and second RV value from the list is used.

In yet another alternative, the interpretation of the RV field in the DCI is extended to select a list of RVs, compared to only a single RV as in current Rel-15 NR. Hence, when scheduling PDSCH, multiple DMRS groups are used (for example indicated by the extended TCI state indicated in the same DCI) and the DMRS groups use the RV in the list in an ordered manner; for example the DMRS group with lowest index is associated to the first RV value in the list and so on. An example of lists is given in Table 6.

The list as exemplified in FIG. 7 may be given by the standard or may be configured, e.g., by higher layer signaling. The list may contain repeated values of the same RV to provide soft combining gains, or different values to provide incremental redundancy gains.

TABLE 6

List of RVs selected by RV field in DCI

| RV field in DCI | Value of $rv_{id}$ to be applied |
|---|---|
| 00 | {0,1,2,3} |
| 01 | {3,0,1,2} |
| 10 | {0,0,3,2} |
| 11 | {3,3,0,1} |

In another embodiment, the length of the list depends on the number of scheduled DMRS groups. For example, if a single DMRS group is scheduled (i.e., single TRP) then it is useful to fall back to the original mapping between RV field and RV value. If there are two DMRS groups scheduled (e.g., indicated by the TCI state), then another list (specified or configured) is used. See an example in Table 7.

TABLE 7

List of RVs selected by RV field in DCI

| RV field in | Value of $rv_{id}$ to be applied if one DMRS | Value of $rv_{id}$ to be apphed if two | Value of $rv_{id}$ to be apphed if three |
|---|---|---|---|
| 00 | 0 | {0,1} | {0,1,2} |
| 01 | 1 | {3,0} | {3,1,0} |
| 10 | 2 | {0,0} | {0,2,3} |
| 11 | 3 | {3,3} | {3,1,0} |

In yet another embodiment, if a PDSCH is transmitted over more than one TRP, the existing RV field in DCI indicates the redundancy version of a PDSCH associated with the first DMRS group. The redundancy versions of the PDSCH associated with other DMRS groups are determined based on the redundancy sequence of {0, 2, 3, 1} as shown in Table 8. For example, if the RV field is 0, then the RV values for DMRS groups {1, 2, 3} are {0, 2, 3}, respectively; If the RV field is 1, then the RV values for DMRS groups {1, 2, 3} are {1, 0, 2}, respectively.

TABLE 8

RVs selected by the RV field in DCI with a predefined sequence {0, 2, 3, 1}.

| RV field in DCI | RV for DMRS group 1 | RV for DMRS group 2 | RV for DMRS group 3 |
|---|---|---|---|
| 00 | 0 | 2 | 3 |
| 01 | 1 | 0 | 2 |
| 10 | 2 | 3 | 1 |
| 11 | 3 | 1 | 0 |

Embodiment 4: Joint Signaling of DMRS Port Group(s) and Associated RV(s) Via TCI Field with Additional MAC CE Down-Selection When the number of TCI states or extended TCI states exceeds 8, a mechanism is needed to demonstrate how to map these TCI states to the TCI field which only contains 3 bits. In this case, the MAC CE for 'TCI State Activation/Deactivation for UE-specific PDSCH' can be used to downselect candidate TCI states or extended TCI states to be mapped to the codepoints of the TCI field.

Figure 9:
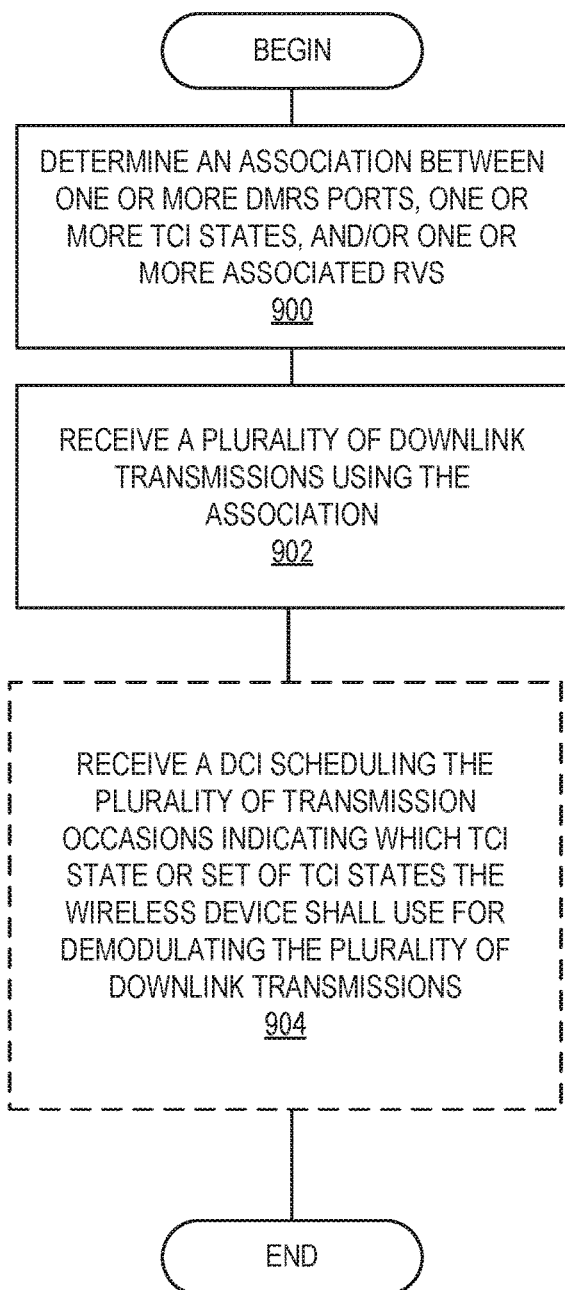
FIG. 9 illustrates a method of operating a wireless device for receiving a plurality of downlink transmissions, according to some embodiments of the present disclosure.

Systems and methods for signaling for PDSCH diversity are provided. FIG. 9 illustrates a method of operating a wireless device for receiving a plurality of downlink transmissions, according to some embodiments of the present disclosure. In some embodiments, a method performed by a wireless device for receiving a plurality of downlink transmissions includes determining an association between one or more DMRS ports, one or more TCI states, and/or one or more associated RVs (step 900). The method also includes the wireless device receiving the plurality of downlink transmissions using the association (step 902). The method optionally includes the wireless device receiving a DCI scheduling the plurality of transmission occasions indicating which TCI state or set of TCI states the wireless device shall use for demodulating the plurality of downlink transmissions (step 904). In some embodiments, this enables a single DCI to be used to schedule different redundancy versions of the same transport block from the different TRPs which helps improve reliability of decoding the TB successfully within stringent latency requirements.

Figure 10:
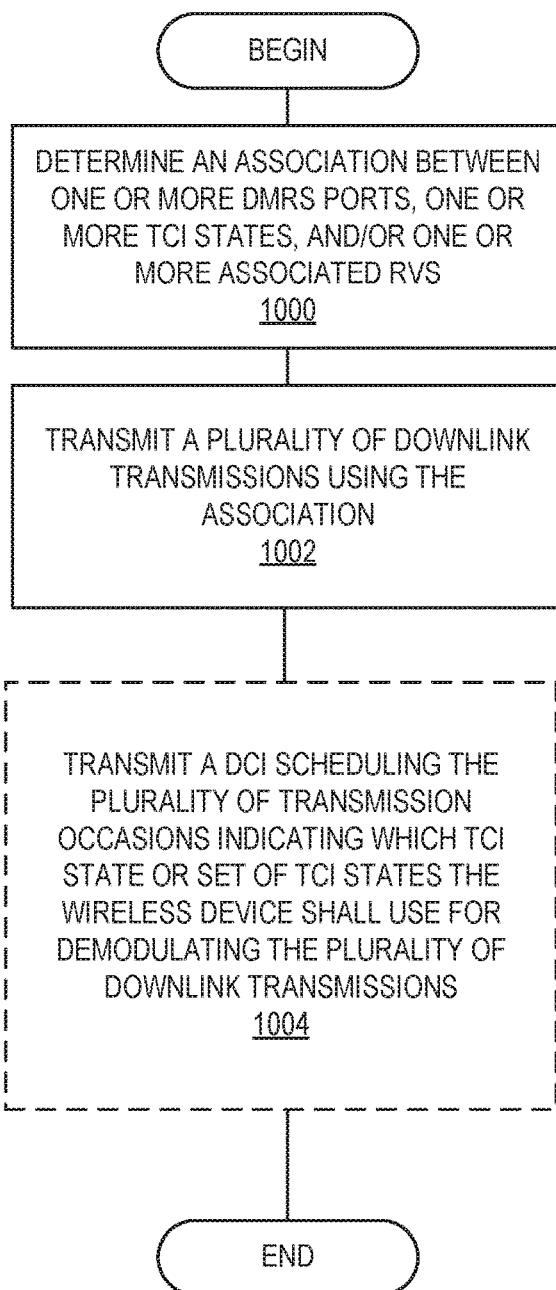
FIG. 10 illustrates a method of operating a base station for enabling reception of a plurality of downlink transmissions, according to some embodiments of the present disclosure.

FIG. 10 illustrates a method of operating a base station for enabling reception of a plurality of downlink transmissions, according to some embodiments of the present disclosure. In some embodiments, a method performed by a base station for enabling reception of a plurality of downlink transmissions includes determining an association between one or more DMRS ports, one or more TCI states, and/or one or more associated RVs (step 1000). The method also includes the base station transmitting the plurality of downlink transmissions using the association (step 1002). The method optionally includes the base station transmitting a DCI scheduling the plurality of transmission occasions indicating which TCI state or set of TCI states the wireless device shall use for demodulating the plurality of downlink transmissions (step 1004). In some embodiments, this enables a single DCI to be used to schedule different redundancy versions of the same transport block from the different TRPs which helps improve reliability of decoding the TB successfully within stringent latency requirements.

Figure 11:
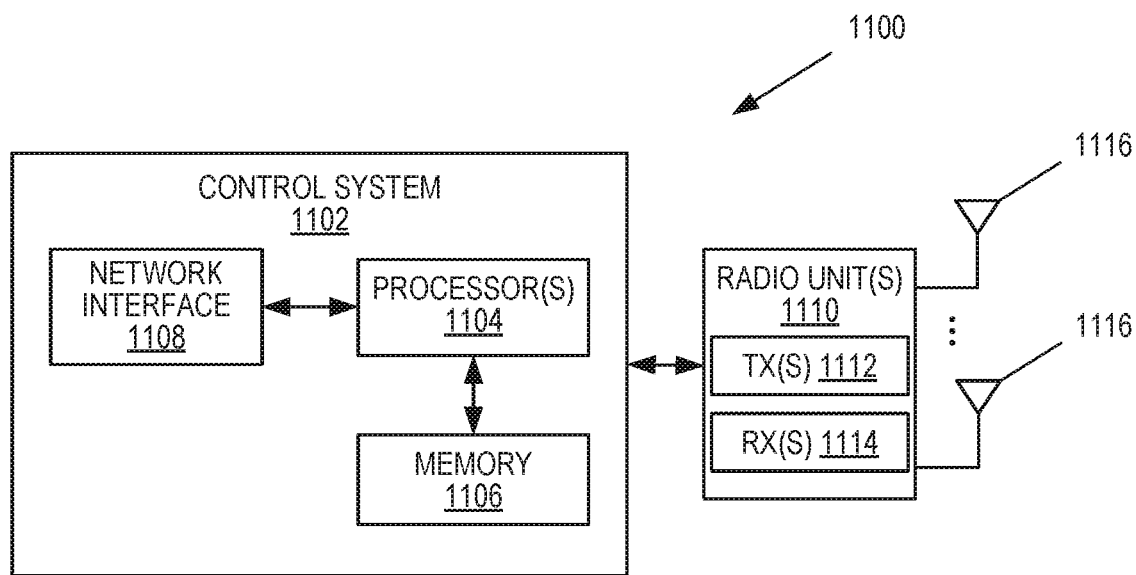
FIG. 11 is a schematic block diagram of a radio access node according to some embodiments of the present disclosure.

FIG. 11 is a schematic block diagram of a radio access node 1100 according to some embodiments of the present disclosure. The radio access node 1100 may be, for example, a base station 602 or 606. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
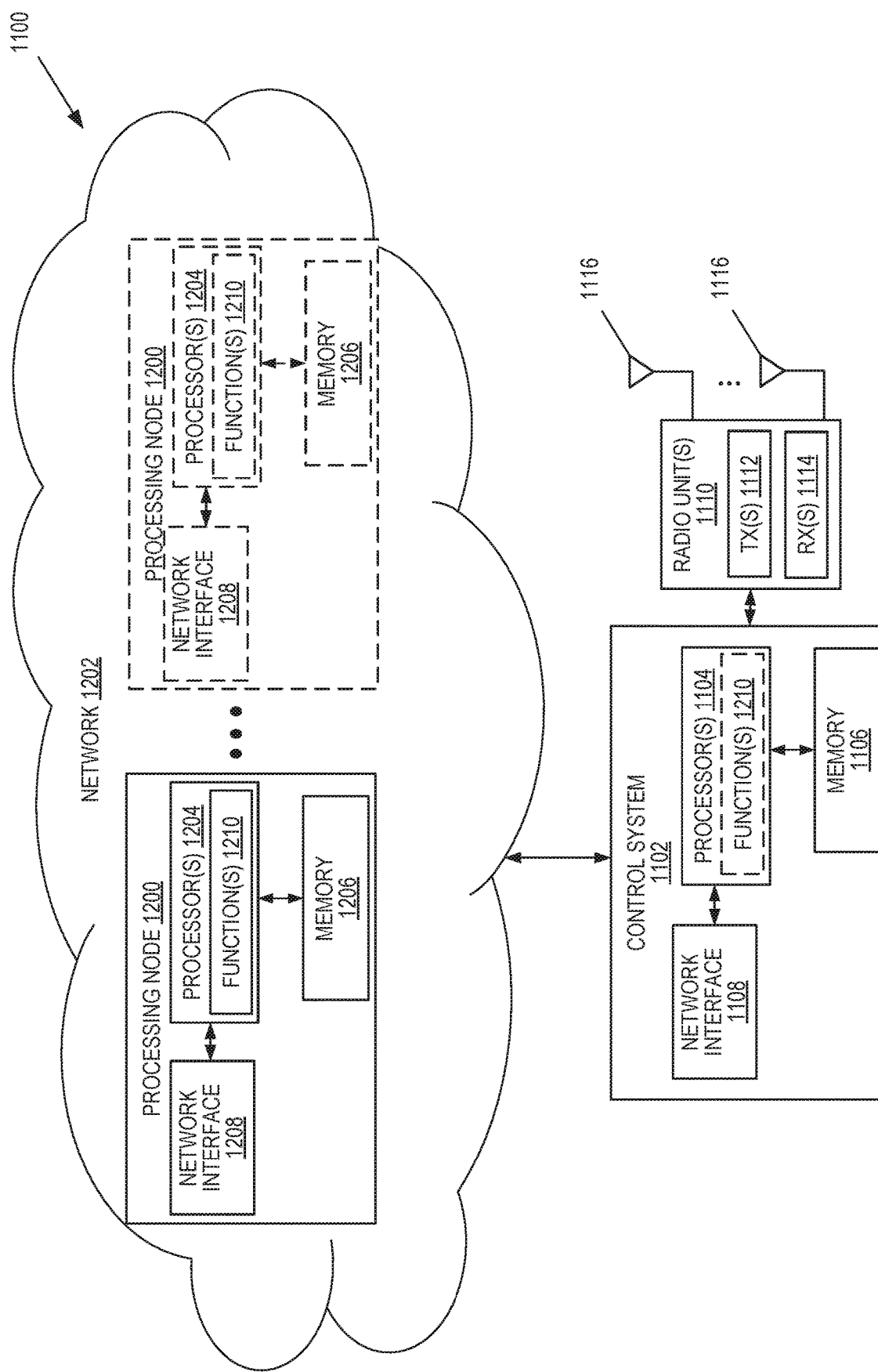
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 includes the control system 1102 that includes the one or more processors 1104 (e.g., CPUs, ASICs, FPGAs, and/or the like), the memory 1106, and the network interface 1108 and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the control system 1102 and the one or more processing nodes 1200 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
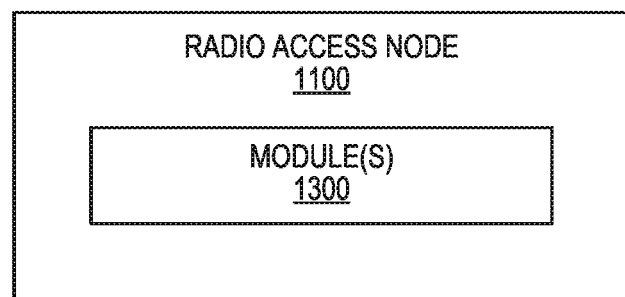
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
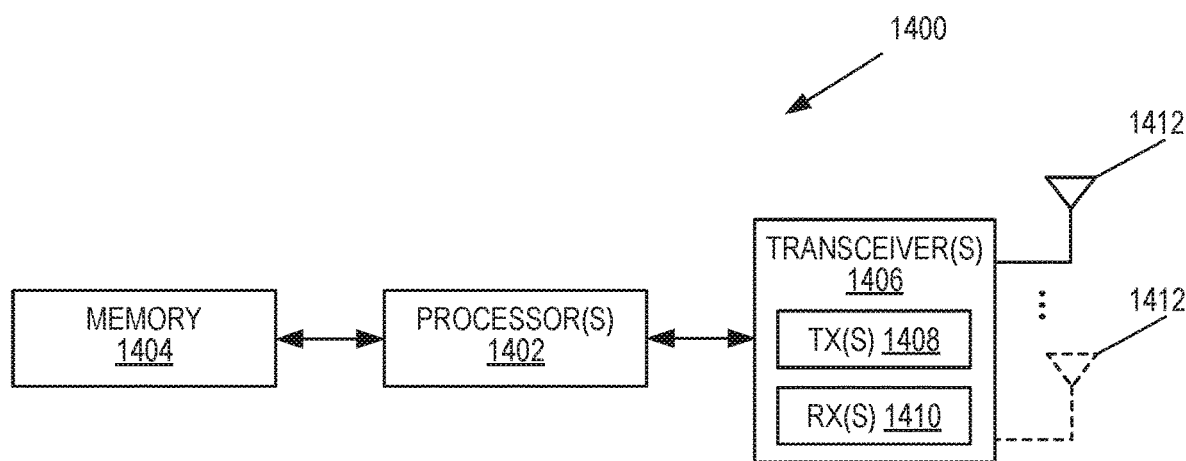
FIG. 14 is a schematic block diagram of a UE according to some embodiments of the present disclosure.

FIG. 14 is a schematic block diagram of a UE 1400 according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the UE 1400 described above may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
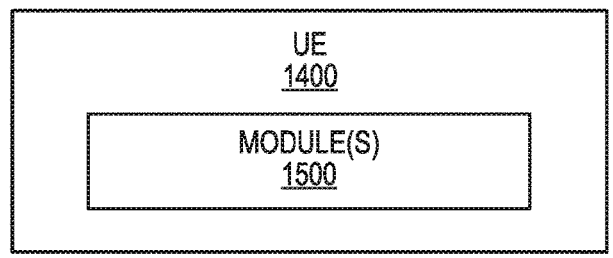
FIG. 15 is a schematic block diagram of the UE according to some other embodiments of the present disclosure.

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein.

Figure 16:
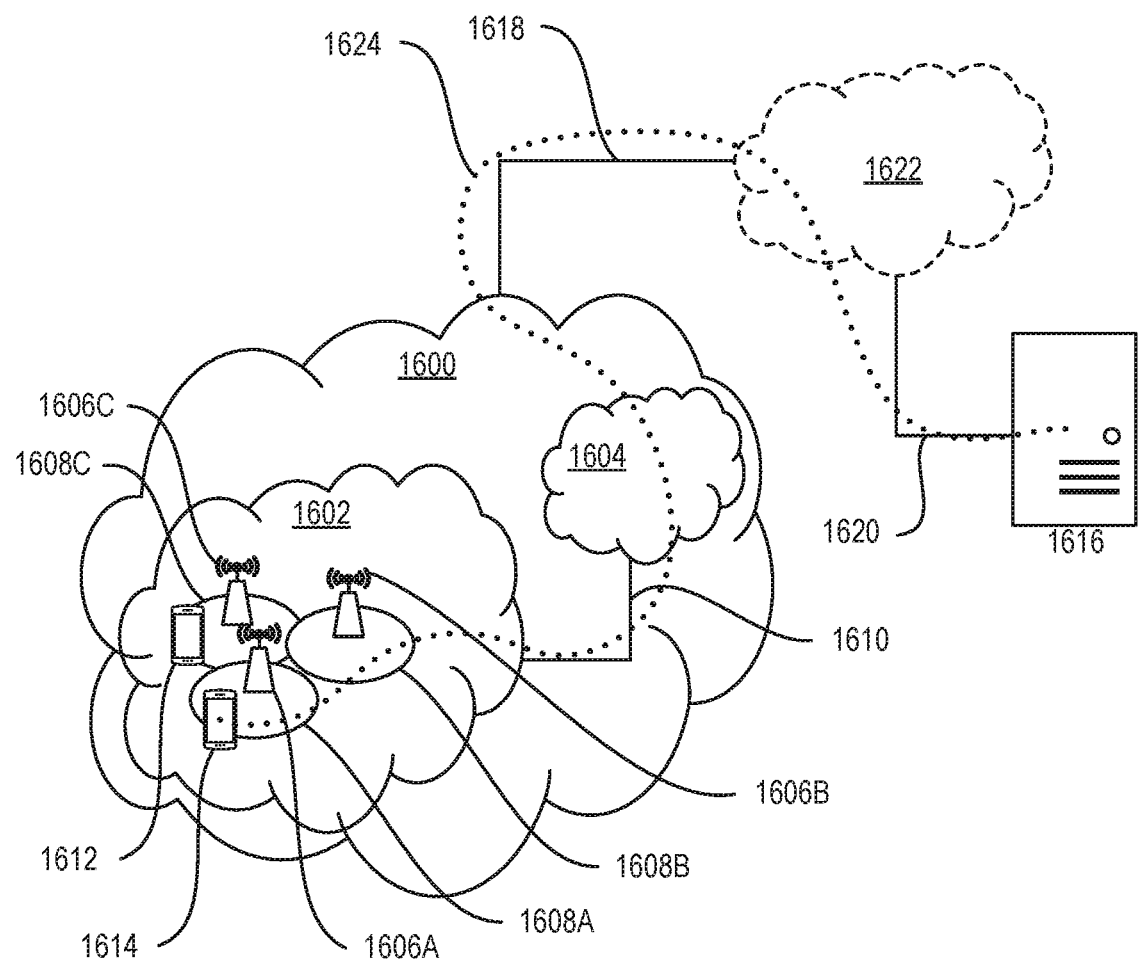
FIG. 16 illustrates a communication system including a telecommunication network, such as a 3GPP-type cellular network according to some embodiments of the present disclosure.

With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as NBs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718.

The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

Figure 17:
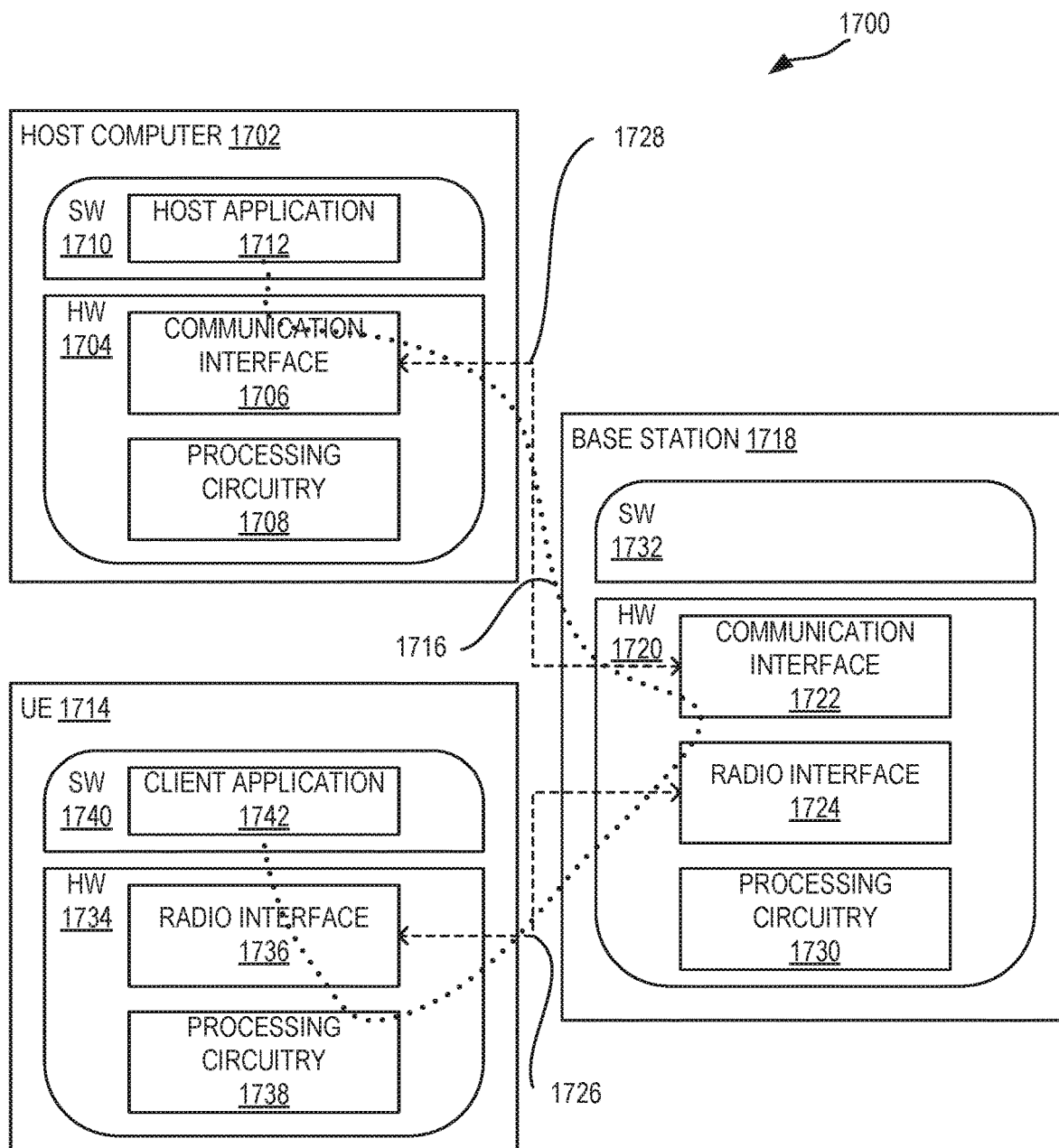
FIG. 17 illustrates a communication system including a host computer, according to some embodiments of the present disclosure.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment. More precisely, the teachings of these embodiments may improve e.g., the data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

Figures 18, 19:
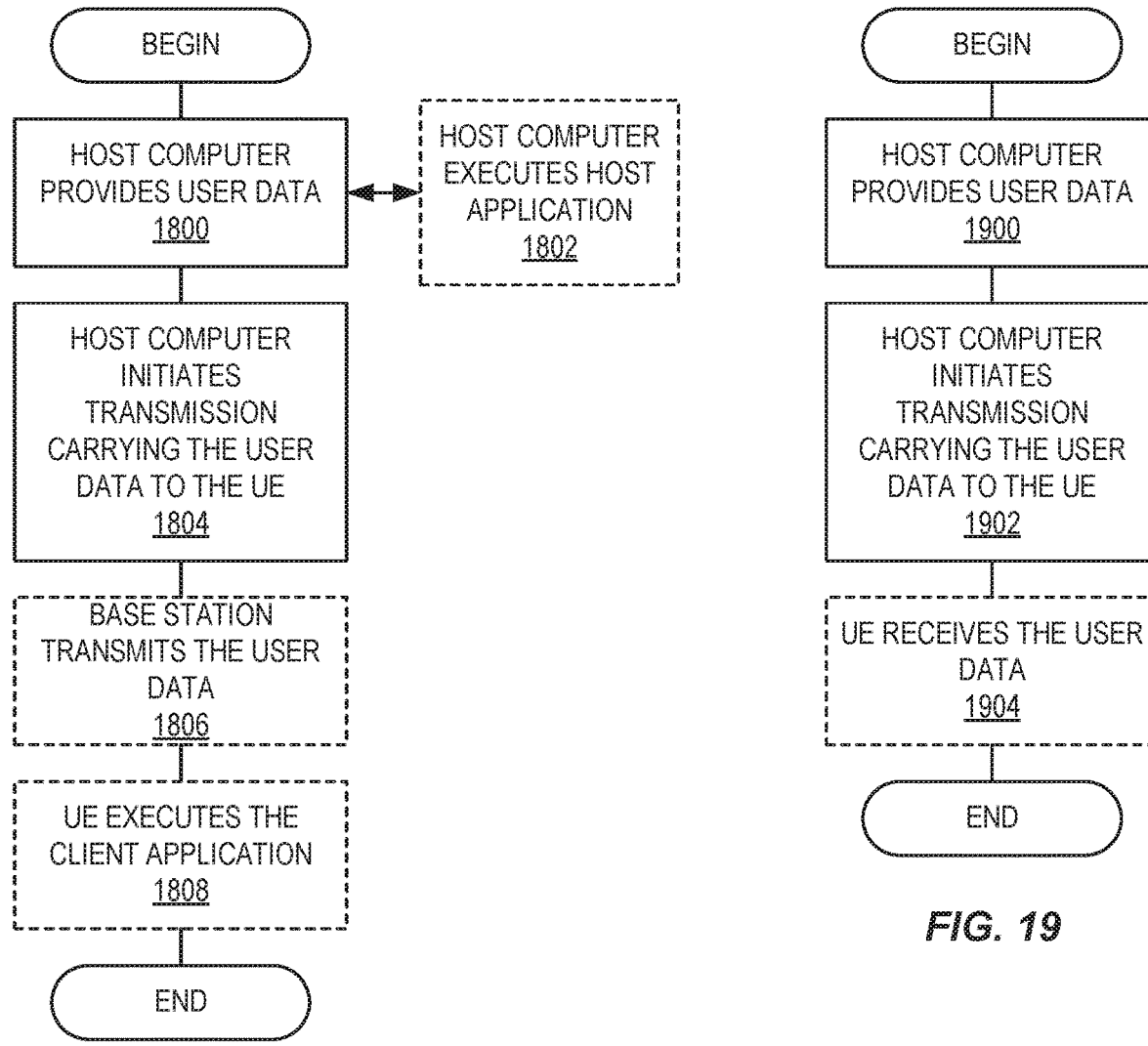
FIG. 18 is a flowchart illustrating a method implemented in a communication system according to some embodiments of the present disclosure.
FIGS. 19-21 are flowcharts illustrating methods implemented in a communication system according to some embodiments of the present disclosure.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

Figures 20, 21:
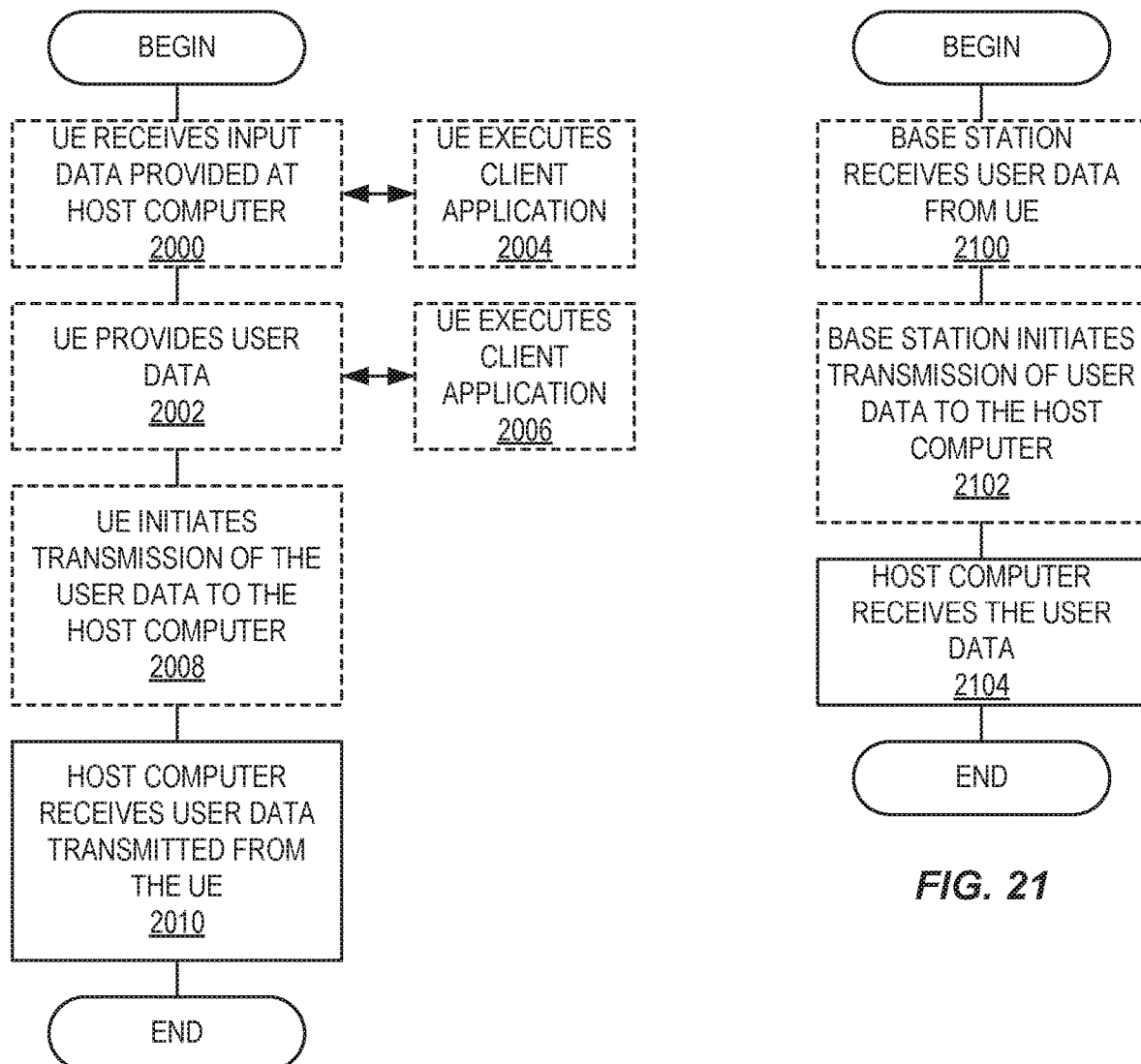

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may per-

Embodiments

Group A Embodiments

1. A method performed by a wireless device for receiving a plurality of downlink transmissions, the method comprising:
   determining an association between one or more Demodulation Reference Signal, DMRS, ports and one or more associated Redundancy Values, RV;
   receiving the plurality of downlink transmissions using the association.
2. The method of embodiment 1 wherein determining the association comprises determining that the one or more DMRS ports are divided into one or more DMRS port groups and the association is between a DMRS port group and a certain RV.
3. The method of any of embodiments 1 to 2 wherein the association is determined by one or more of the group consisting of: configured by higher layers; dynamically indicated by Downlink Control Information, DCI; dynamically indicated by Medium Access Control, MAC, Control Elements, CEs; and/or defined by a specification.
4. The method of any of embodiments 1 to 3 wherein receiving the plurality of downlink transmissions using the association comprises:
   decoding one or more Physical Downlink Shared Channel, PDSCH, layers or PDSCH codeword(s) from a certain Transmission/Reception Point, TRP, where which RV was used is known due to the association with the DMRS port group transmitted by the certain TRP.
5. The method of any of embodiments 1 to 4 wherein a Transmission Configuration Indication, TCI, state or TCI state Identifier, ID, is also associated with the DMRS port group and the associated RV.
6. The method of any of embodiments 1 to 5 further comprising:
   receiving a DCI scheduling the plurality of downlink transmissions indicating which TCI state or set of TCI states the wireless device shall use for demodulating the plurality of downlink transmissions.
7. The method of embodiment 6 wherein the DMRS port group and the associated RV (along with the TCI state/TCI state ID) is indicated by a codepoint in a DCI field of the DCI, e.g., the TCI state indication field.
8. The method of any of embodiments 6 to 7 wherein the TCI field in DCI format 1_1 is used for joint signaling of the DMRS port group(s) and the associated RV(s).
9. The method of any of embodiments 6 to 7 wherein a new DCI field is introduced in DCI format 1_1 for joint signaling of the DMRS port group(s) and the associated RV(s).
10. The method of any of embodiments 1 to 9 wherein determining the association comprises one or more of the group consisting of: receiving Radio Resource Control, RRC, signaling indicating the association; dynamically indicated by DCI; dynamically indicated by MAC CEs; and/or defined by a specification.
11. The method of any of embodiments 1 to 2 wherein DMRS port group(s) and the associated RV(s) are indicated via an antenna ports field present in Downlink Control Information, DCI, format 1_1.
12. The method of embodiment 11 wherein when the antenna port field takes on a subset values allowed for the antenna port field, the wireless device receives a downlink transmission from two Transmission/Reception Point, TRPs, with one DMRS port group and RV associated with each TRP.
13. The method of any of embodiments 11 to 12 wherein the DMRS port groups are indicated via the antenna ports field while the RV corresponding to a first DMRS port group is provided by an RV field.
14. The method of embodiment 13 wherein the RVs corresponding to the remaining DMRS port groups are indicated by the antenna ports field.
15. The method of any of embodiments 11 to 12 wherein the DMRS port groups are indicated via a Transmission Configuration Indication, TCI, field while the RV corresponding to a first DMRS port group is provided by an RV field.
16. The method of embodiment 15 wherein the RVs corresponding to the remaining DMRS port groups are defined in a TCI state or an extended TCI state and are indicated by the TCI field.
17. The method of any of embodiments 1 to 2 wherein determining the association comprises a pre-defined ordered list of RVs.
18. The method of embodiment 17 wherein if a single DMRS group is used, then a first RV from the list is used; if two DMRS groups are used, then the first and a second RV value from the list are used.
19. The method of any of embodiments 1 to 18 wherein the interpretation of the RV field is extended to select a list of RVs; multiple DMRS groups are used and the multiple DMRS groups use the RV in the list in an ordered manner.
20. The method of any of embodiments 1 to 19 further comprising receiving a MAC CE to downselect candidate TCI states or the extended TCI states to be mapped to codepoints of the TCI field.
21. The method of embodiment 20 wherein the MAC CE is 'TCI State Activation/Deactivation for UE-specific PDSCH'.
22. The method of any of the previous embodiments, further comprising:
   providing user data; and
   forwarding the user data to a host computer via the transmission to the base station.

Group B Embodiments

23. A method performed by a node for enabling a plurality of downlink transmissions, the method comprising:
   determining an association between one or more Demodulation Reference Signal, DMRS, ports and one or more associated Redundancy Values, RV;
   enabling the plurality of downlink transmissions using the association.
24. The method of embodiment 23 wherein determining the association comprises determining that the one or more DMRS ports are divided into one or more DMRS port groups and the association is between a DMRS port group and a certain RV.
25. The method of any of embodiments 23 to 24 wherein the association is determined by one or more of the group consisting of: configured by higher layers; dynamically indicated by Downlink Control Information, DCI; dynamically indicated by Medium Access Control, MAC, Control Elements, CEs; and/or defined by a specification.

26. The method of any of embodiments 23 to 25 wherein enabling the plurality of downlink transmissions using the association comprises:
- enabling one or more Physical Downlink Shared Channel, PDSCH, layers or PDSCH codeword(s) from a certain Transmission/Reception Point, TRP, where which RV was used is known due to the association with the DMRS port group transmitted by the certain TRP.

27. The method of any of embodiments 23 to 26 wherein a Transmission Configuration Indication, TCI, state or TCI state Identifier, ID, is also associated with the DMRS port group and the associated RV.

28. The method of any of embodiments 23 to 27 further comprising:
- enabling transmission of a DCI scheduling the plurality of downlink transmissions indicating which TCI state or set of TCI states the wireless device shall use for demodulating the plurality of downlink transmissions.

29. The method of embodiment 28 wherein the DMRS port group and the associated RV (along with the TCI state/TCI state ID) is indicated by a codepoint in a DCI field of the DCI, e.g., the TCI state indication field.

30. The method of any of embodiments 28 to 29 wherein the TCI field in DCI format 1_1 is used for joint signaling of the DMRS port group(s) and the associated RV(s).

31. The method of any of embodiments 28 to 29 wherein a new DCI field is introduced in DCI format 11 for joint signaling of the DMRS port group(s) and the associated RV(s).

32. The method of any of embodiments 23 to 31 wherein determining the association comprises enabling transmission of Radio Resource Control, RRC, signaling indicating the association.

33. The method of embodiment 23 wherein DMRS port group(s) and the associated RV(s) are indicated via an antenna ports field present in Downlink Control Information, DCI, format 1_1.

34. The method of embodiment 33 wherein when the antenna port field takes on a subset of values allowed for the antenna port field, the wireless device receives a downlink transmission from two Transmission/Reception Point, TRPs, with one DMRS port group and RV associated with each TRP.

35. The method of any of embodiments 33 to 34 wherein the DMRS port groups are indicated via the antenna ports field while the RV corresponding to a first DMRS port group is provided by an RV field.

36. The method of embodiment 35 wherein the RVs corresponding to the remaining DMRS port groups are indicated by the antenna ports field.

37. The method of any of embodiments 33 to 34 wherein the DMRS port groups are indicated via a Transmission Configuration Indication, TCI, field while the RV corresponding to a first DMRS port group is provided by an RV field.

38. The method of embodiment 37 wherein the RVs corresponding to the remaining DMRS port groups are defined in a TCI state or an extended TCI state and are indicated by the TCI field.

39. The method of embodiment 23 wherein determining the association comprises a pre-defined ordered list of RVs.

40. The method of embodiment 39 wherein if a single DMRS group is used, then a first RV from the list is used; if two DMRS groups are used, then the first and a second RV value from the list are used.

41. The method of any of embodiments 23 to 40 wherein the interpretation of the RV field is extended to select a list of RVs; multiple DMRS groups are used and the multiple DMRS groups use the RV in the list in an ordered manner.

42. The method of any of embodiments 23 to 41 further comprising enabling transmission of a MAC CE to downselect candidate TCI states or the extended TCI states to be mapped to codepoints of the TCI field.

43. The method of embodiment 42 wherein the MAC CE is 'TCI State Activation/Deactivation for UE-specific PDSCH'.

44. The method of any of the previous embodiments, further comprising:
- obtaining user data; and
- forwarding the user data to a host computer or a wireless device.

Group C Embodiments

45. A wireless device for receiving a plurality of downlink transmissions, the wireless device comprising:
- processing circuitry configured to perform any of the steps of any of the Group A embodiments; and
- power supply circuitry configured to supply power to the wireless device.

46. A node for enabling a plurality of downlink transmissions, the node comprising:
- processing circuitry configured to perform any of the steps of any of the Group B embodiments; and
- power supply circuitry configured to supply power to the node.

47. A User Equipment, UE, for receiving a plurality of downlink transmissions, the UE comprising:
- an antenna configured to send and receive wireless signals;
- radio front-end circuitry connected to the antenna and to processing circuitry, and configured to condition signals communicated between the antenna and the processing circuitry;
- the processing circuitry being configured to perform any of the steps of any of the Group A embodiments;
- an input interface connected to the processing circuitry and configured to allow input of information into the UE to be processed by the processing circuitry;
- an output interface connected to the processing circuitry and configured to output information from the UE that has been processed by the processing circuitry; and
- a battery connected to the processing circuitry and configured to supply power to the UE.

48. A communication system including a host computer comprising:
- processing circuitry configured to provide user data; and
- a communication interface configured to forward the user data to a cellular network for transmission to a User Equipment, UE;
- wherein the cellular network comprises a node having a radio interface and processing circuitry, the node's processing circuitry configured to perform any of the steps of any of the Group B embodiments.

49. The communication system of the previous embodiment further including the node.

50. The communication system of the previous 2 embodiments, further including the UE, wherein the UE is configured to communicate with the node.

51. The communication system of the previous 3 embodiments, wherein:
- the processing circuitry of the host computer is configured to execute a host application, thereby providing the user data; and the UE comprises processing circuitry configured to execute a client application associated with the host application.

52. A method implemented in a communication system including a host computer, a node, and a User Equipment, UE, the method comprising:
at the host computer, providing user data; and
at the host computer, initiating a transmission carrying the user data to the UE via a cellular network comprising the node, wherein the node performs any of the steps of any of the Group B embodiments.

53. The method of the previous embodiment, further comprising, at the node, transmitting the user data.

54. The method of the previous 2 embodiments, wherein the user data is provided at the host computer by executing a host application, the method further comprising, at the UE, executing a client application associated with the host application.

55. A User Equipment, UE, configured to communicate with a node, the UE comprising a radio interface and processing circuitry configured to perform the method of the previous 3 embodiments.

56. A communication system including a host computer comprising:
processing circuitry configured to provide user data; and
a communication interface configured to forward user data to a cellular network for transmission to a User Equipment, UE;
wherein the UE comprises a radio interface and processing circuitry, the UE's components configured to perform any of the steps of any of the Group A embodiments.

57. The communication system of the previous embodiment, wherein the cellular network further includes a node configured to communicate with the UE.

58. The communication system of the previous 2 embodiments, wherein:
the processing circuitry of the host computer is configured to execute a host application, thereby providing the user data; and
the UE's processing circuitry is configured to execute a client application associated with the host application.

59. A method implemented in a communication system including a host computer, a node, and a User Equipment, UE, the method comprising:
at the host computer, providing user data; and
at the host computer, initiating a transmission carrying the user data to the UE via a cellular network comprising the node, wherein the UE performs any of the steps of any of the Group A embodiments.

60. The method of the previous embodiment, further comprising at the UE, receiving the user data from the node.

61. A communication system including a host computer comprising:
communication interface configured to receive user data originating from a transmission from a User Equipment, UE, to a node;
wherein the UE comprises a radio interface and processing circuitry, the UE's processing circuitry configured to perform any of the steps of any of the Group A embodiments.

62. The communication system of the previous embodiment, further including the UE.

63. The communication system of the previous 2 embodiments, further including the node, wherein the node comprises a radio interface configured to communicate with the UE and a communication interface configured to forward to the host computer the user data carried by a transmission from the UE to the node.

64. The communication system of the previous 3 embodiments, wherein:
the processing circuitry of the host computer is configured to execute a host application; and
the UE's processing circuitry is configured to execute a client application associated with the host application, thereby providing the user data.

65. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

66. A method implemented in a communication system including a host computer, a node, and a User Equipment, UE, the method comprising:
at the host computer, receiving user data transmitted to the node from the UE, wherein the UE performs any of the steps of any of the Group A embodiments.

67. The method of the previous embodiment, further comprising, at the UE, providing the user data to the node.

68. The method of the previous 2 embodiments, further comprising:
at the UE, executing a client application, thereby providing the user data to be transmitted; and
at the host computer, executing a host application associated with the client application.

69. The method of the previous 3 embodiments, further comprising:
at the UE, executing a client application; and
at the UE, receiving input data to the client application, the input data being provided at the host computer by executing a host application associated with the client application;
wherein the user data to be transmitted is provided by the client application in response to the input data.

70. A communication system including a host computer comprising a communication interface configured to receive user data originating from a transmission from a User Equipment, UE, to a node, wherein the node comprises a radio interface and processing circuitry, the node's processing circuitry configured to perform any of the steps of any of the Group B embodiments.

71. The communication system of the previous embodiment further including the node.

72. The communication system of the previous 2 embodiments, further including the UE, wherein the UE is configured to communicate with the node.

73. The communication system of the previous 3 embodiments, wherein:
the processing circuitry of the host computer is configured to execute a host application; and
the UE is configured to execute a client application associated with the host application, thereby providing the user data to be received by the host computer.

74. A method implemented in a communication system including a host computer, a node, and a User Equipment, UE, the method comprising:
at the host computer, receiving, from the node, user data originating from a transmission which the node has received from the UE, wherein the UE performs any of the steps of any of the Group A embodiments.

75. The method of the previous embodiment, further comprising at the node, receiving the user data from the UE.

76. The method of the previous 2 embodiments, further comprising at the node, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
CDM Code Division Multiplexing
CE Control Element
CP-OFDM Cyclic Prefix Orthogonal Frequency Division Multiplexing
CPU Central Processing Unit
CSI Channel State Information
CSI-RS Channel State Information Reference Signal
CW Codeword
DCI Downlink Control Information
DFT Discrete Fourier Transform
DFT-S-OFDM DFT-Spread-Orthogonal Frequency Division Multiplexing
DMRS Demodulation Reference Signal
DPS Dynamic Transmission Point Selection
DSP Digital Signal Processor
eNB Enhanced or Evolved Node B
eURLLC Enhanced Ultra Reliable Low Latency Communication
FPGA Field Programmable Gate Array
GHz Gigahertz
gNB New Radio Base Station
ID Identifier
IP Internet Protocol
LTE Long Term Evolution
MAC Medium Access Control
MIMO Multiple Input Multiple Output
MME Mobility Management Entity
MTC Machine Type Communication
NR New Radio
OFDM Orthogonal Frequency Division Multiplexing
OTT Over-the-Top
PDCCH Physical Downlink Control Channel
PDCH Physical Data Channel
PDCP Packet Data Convergence Protocol
PDSCH Physical Downlink Shared Channel
P-GW Packet Data Network Gateway
PMI Precoder Matrix Indicator
PUSCH Physical Uplink Shared Channel
QCL Quasi Co-Located
RAM Random Access Memory
RAN Radio Access Network
RAT Radio Access Technology
RB Resource Block
RE Resource Element
ROM Read Only Memory
RRC Radio Resource Control
RS Reference Signal
RV Redundancy Value
SCEF Service Capability Exposure Function
SINR Signal to Interference Plus Noise Ratio
SSB Synchronization Signal Block
TB Transport Block
TCI Transmission Configuration Indication
TRP Transmission/Reception Point
UE User Equipment Those skilled in the art will recognize improvements and modifications to the embodiments of the present disclosure. All such improvements and modifications are considered within the scope of the concepts disclosed herein.

What is claimed is:

1. A method performed by a wireless device for receiving a plurality of downlink transmissions, the method comprising:
    determining a plurality of associations between one or more Demodulation Reference Signal (DMRS) ports and one or more Redundancy Versions (RVs) wherein where for each of the plurality of associations, determining the association comprises:
        determining that the one or more DMRS ports belongs to a DMRS port group and associating the DMRS port group with a certain RV;
        associating a Transmission Configuration Indication (TCI) state or TCI state Identifier (ID) with the certain RV; and
        associating the TCI state or the TCI state ID with the DMRS port group and the certain RV; and
    receiving the plurality of downlink transmissions using the plurality of associations.

2. The method of claim 1 wherein a first association among the plurality of associations is used to receive a first downlink transmission among the plurality of downlink transmissions, and a second association among the plurality of associations is used to receive a second downlink transmission among the plurality of downlink transmissions.

3. The method of claim 1 wherein the plurality of downlink transmissions correspond to transmission of one or more Physical Downlink Shared Channel (PDSCH) transmissions.

4. The method of claim 1 wherein the DMRS port group comprises one Code Division Multiplexing (CDM) group.

5. The method of claim 1 wherein receiving the plurality of downlink transmissions using the association comprises:
    Decoding one or more PDSCH transmissions, PDSCH layers or PDSCH codewords corresponding to one or more of the plurality of downlink transmissions, wherein which certain RV was used for a certain downlink transmission is known due to the association with the TCI state and the DMRS port group corresponding to the certain downlink transmission.

6. The method of claim 1 further comprising:
    receiving Downlink Control Information (DCI) scheduling a plurality of transmission occasions indicating the TCI state or a set of TCI states the wireless device shall use for demodulating the plurality of downlink transmissions.

7. The method of claim 1 wherein the DMRS port group and the certain RV are indicated by codepoints of a plurality of DCI fields of the DCI, wherein, optionally, one or more of the following are satisfied: the one or more DMRS ports are indicated by an antenna ports field, TCI states are indicated by a TCI field, the certain RVs are indicated by an RV field.

8. The method of claim 1 wherein determining the plurality of associations comprises one or more of the group consisting of: receiving a configuration from higher layers; receiving Radio Resource Control (RRC) signaling indicating whether the association is dynamically indicated by the DCI; dynamically indicated by Medium Access Control (MAC) Control Elements (CEs); and/or defined by a specification.

9. The method of claim 1 further comprising receiving a MAC CE to downselect candidate TCI states or extended TCI states to be mapped to codepoints of a TC field.

10. The method of claim 9 wherein the MAC CE is 'TCI State Activation/Deactivation for UE-specific PDSCH'.

11. A method performed by a base station for enabling reception of a plurality of downlink transmissions, the method comprising:
   determining a plurality of associations between one or more Demodulation Reference Signal (DMRS) ports and one or more Redundancy Versions (RVs) wherein for each of the plurality of associations, determining the association comprises:
      determining that the one or more DMRS ports belonging to a DMRS port group and associating the DMRS port group with a certain RV;
      associating a Transmission Configuration Indication (TCI) state or TCI state Identifier (ID) with the certain RV; and
      associating the TCI state or the TCI state ID with the DMRS port group and the certain RV; and
   transmitting the plurality of downlink transmissions using the plurality of associations.

12. The method of claim 11 wherein a first association among the plurality of associations is used to transmit a first downlink transmission among the plurality of downlink transmissions, and a second association among the plurality of associations is used to transmit a second downlink transmission among the plurality of downlink transmissions.

13. The method of claim 11 wherein the plurality of downlink transmissions correspond to transmission of one or more Physical Downlink Shared Channel (PDSCH) transmissions.

14. The method of claim 13 wherein the DMRS port groups comprises one Code Division Multiplexing (CDM) group.

15. The method of claim 11 wherein transmitting the plurality of downlink transmissions using the association comprises:
   coding one or more PDSCH transmissions, PDSCH layers or PDSCH codewords corresponding to one or more of the plurality of downlink transmissions, wherein which certain RV was used is known due to the association with the TCI state and the DMRS port group corresponding to a certain downlink transmission.

16. The method of claim 11 further comprising:
   transmitting Downlink Control Information (DCI) scheduling a plurality of transmission occasions indicating the TCI state or a set of TCI states a wireless device shall use for demodulating the plurality of downlink transmissions.

17. The method of claim 16 wherein the DMRS port group and the certain RV are indicated by codepoints of a plurality of DCI fields of the DCI, wherein, optionally, one or more of the following are satisfied: the one or more DMRS ports are indicated by an antenna ports field, the TCI states are indicated by a TCI field, the certain RVs are indicated by an RV field.

18. The method of claim 11 wherein determining the plurality of associations comprises one or more of the group consisting of: transmitting a configuration from higher layers; transmitting Radio Resource Control (RRC) signaling indicating whether the association is dynamically indicated by the DCI; dynamically indicated by Medium Access Control (MAC) Control Elements (CEs); and/or defined by a specification.

19. The method of claim 11 further comprising transmitting a MAC CE to downselect candidate TCI states or extended TCI states to be mapped to codepoints of a TCI field.

20. The method of claim 19 wherein the MAC CE is 'TCI State Activation/Deactivation for UE-specific PDSCH'.

21. A wireless device for receiving a plurality of downlink transmissions, the wireless device comprising:
   one or more processors; and
   memory comprising instructions to cause the wireless device to:
      determine a plurality of associations between one or more Demodulation Reference Signal (DMRS) ports and one or more associated Redundancy Versions (RVs) wherein for each of the plurality of associations, determining the association comprises instructions to cause the wireless device to:
         determine that the one or more DMRS ports belong to a DMRS port group and associate the DMRS port group with a certain RV;
         associate a Transmission Configuration Indication (TCI) state or TCI state Identifier (ID) with the certain RV; and
         associate the TCI state or TCI state ID with the DMRS port group and the certain RV; and
      receive the plurality of downlink transmissions using the plurality of associations.

22. A base station for enabling reception of a plurality of downlink transmissions, the base station comprising:
   one or more processors; and
   memory comprising instructions to cause the base station to:
      determine a plurality of associations between one or more Demodulation Reference Signal (DMRS) ports and one or more associated Redundancy Versions (RVs) wherein for each of the plurality of associations determining the association comprises instructions to cause the base station to:
         determine that the one or more DMRS ports belong to a DMRS port group and associate the DMRS port group with a certain RV;
         associate a Transmission Configuration Indication (TCI) state or TCI state Identifier (ID) with the certain RV; and
         associate the TCI state or TCI state ID with the DMRS port group and the certain RV; and
      transmit the plurality of downlink transmissions using the plurality of associations.

\* \* \* \* \*

UNITED STATES PATENT AND TRADEMARK OFFICE
CERTIFICATE OF CORRECTION

| | | |
|---|---|---|
| PATENT NO. | : 12,185,310 B2 | Page 1 of 1 |
| APPLICATION NO. | : 17/290840 | |
| DATED | : December 31, 2024 | |
| INVENTOR(S) | : Siva Muruganathan et al. | |

It is certified that error appears in the above-identified patent and that said Letters Patent is hereby corrected as shown below:

In the Claims

In Column 32, Line 17, delete "where", therefor.

Signed and Sealed this
Second Day of December, 2025

John A. Squires
*Director of the United States Patent and Trademark Office*